United States Patent
Ding et al.

(10) Patent No.: US 12,537,607 B2
(45) Date of Patent: Jan. 27, 2026

(54) STATUS NOTIFICATION METHOD, OPTICAL MODULE, NETWORK DEVICE, AND NETWORK SYSTEM

(71) Applicant: Huawei Technologies Co., Ltd., Shenzhen (CN)

(72) Inventors: Li Ding, Shenzhen (CN); Jianbing Wang, Nanjing (CN); Desheng Sun, Shenzhen (CN); Hongjun Bi, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 281 days.

(21) Appl. No.: 18/349,645

(22) Filed: Jul. 10, 2023

(65) Prior Publication Data

US 2023/0353255 A1 Nov. 2, 2023

Related U.S. Application Data

(63) Continuation of application No. PCT/CN2021/139424, filed on Dec. 18, 2021.

(30) Foreign Application Priority Data

Jan. 8, 2021 (CN) .......................... 202110021317.3
Apr. 2, 2021 (CN) .......................... 202110363540.6

(51) Int. Cl.
*H04B 10/85* (2013.01)
*H04L 9/32* (2006.01)
*H04Q 11/00* (2006.01)

(52) U.S. Cl.
CPC ............. *H04B 10/85* (2013.01); *H04L 9/321* (2013.01); *H04Q 11/0062* (2013.01)

(58) Field of Classification Search
CPC ......... H04B 10/85; H04B 10/25; H04L 9/321; H04L 63/0428; H04L 63/20; H04Q 11/0062; H04Q 11/00
See application file for complete search history.

(56) References Cited

U.S. PATENT DOCUMENTS 9,876,709 B1    1/2018  Jones
11,705,694 B1*  7/2023  Zhang ..................... H01S 5/141
                                                           372/44.01

(Continued)

FOREIGN PATENT DOCUMENTS

CN    104869176 A    8/2015
WO    2020244412 A1  12/2020

OTHER PUBLICATIONS

IEEE Std 802.3-2018, IEEE Standard for Ethernet LAN/MAN Standards Committee of the, IEEE Computer Society, Jun. 14, 2018, 5600 pages.

(Continued)

*Primary Examiner* — Mohammad W Reza
(74) *Attorney, Agent, or Firm* — Conley Rose, P.C.

(57) ABSTRACT

A status notification method includes: determining a lock status of a logical lane in a first optical module, where the first optical module belongs to a first network device, and the lock status includes a locked state or an unlocked state; and sending uplink notification information when the lock status indicates that the logical lane in the first optical module is locked, where the uplink notification information is used to enable a second optical module to determine that the logical lane in the first optical module is locked, the second optical module belongs to a second network device, and the first optical module is coupled to the second optical module.

30 Claims, 15 Drawing Sheets

(56) References Cited

U.S. PATENT DOCUMENTS

| | | | |
|---|---|---|---|
| 2010/0229067 A1 | 9/2010 | Ganga et al. | |
| 2010/0229071 A1 | 9/2010 | Ganga et al. | |
| 2010/0329112 A1 | 12/2010 | Ahn et al. | |
| 2011/0110253 A1 | 5/2011 | Ahn et al. | |
| 2015/0244649 A1 | 8/2015 | Krakirian et al. | |
| 2016/0344470 A1 | 11/2016 | Reddy Bovilla et al. | |
| 2018/0357848 A1* | 12/2018 | McLellan | G06F 21/44 |
| 2020/0119813 A1* | 4/2020 | Zhang | H04B 10/505 |
| 2022/0060312 A1* | 2/2022 | Xu | H04J 14/02 |
| 2022/0094463 A1 | 3/2022 | Sun et al. | |

OTHER PUBLICATIONS

IEEE Std 802.3ck-2022 IEEE Standard for Ethernet, Amendment 4: Physical Layer Specification and Management Parameters for 100 GB/s, 200 GB/s, and 400 GB/s Electrical Interfaces Based on 100 GB/s Signaling, IEE Computer Society, Sep. 21, 2022, 316 pages.
Huawei, Building an Intelligent Ultra-High Speed Optical Network with Ultimate Performance, Huawei's new-generation high-speed coherent transmission system, May 25, 2015, with an English translation, 47 pages.

* cited by examiner

Bit position: 0    23 24 31 32    55 56 63 64    87 88 95 96    119

| {CM$_0$, CM$_1$, CM$_2$} | UP$_0$ | {CM$_3$, CM$_4$, CM$_5$} | UP$_1$ | {UM$_0$, UM$_1$, UM$_2$} | UP$_2$ | {UM$_3$, UM$_4$, UM$_5$} |

FIG. 4

| Logical lane number | Encoding (encoding) $\{CM_0, CM_1, CM_2, UP, CM_3, CM_4, CM_5, UP, UM_0, UM_1, UM_2, UP, UM_3, UM_4, UM_5\}$ |
|---|---|
| 0 | 0x9A,0x4A,0x26,0xB6,0x65,0xB5,0xD9, 0xD9,0x01,0x71,0xF3,0x26,0xFE,0x8E,0x0C |
| 1 | 0x9A,0x4A,0x26,0x04, 0x65,0xB5,0xD9,0x67,0x5A,0xDE, 0x7E,0x98,0xA5,0x21,0x81 |
| 2 | 0x9A,0x4A,0x26,0x46, 0x65,0xB5,0xD9,0xFE,0x3E,0xF3,0x56,0x01,0xC1,0x0C,0xA9 |
| 3 | 0x9A,0x4A,0x26,0x5A, 0x65,0xB5,0xD9,0x84,0x86,0x80,0xD0,0x7B,0x79,0x7F,0x2F |
| 4 | 0x9A,0x4A,0x26,0x3D, 0x65,0xB5,0xD9,0x19,0x2A,0x51,0xF2,0xE6,0xD5,0xAE,0x0D |
| 5 | 0x9A,0x4A,0x26,0xE1, 0x65,0xB5,0xD9,0x4E,0x12,0x4F,0xD1,0xB1,0xED,0xB0,0x2E |
| 6 | 0x9A,0x4A,0x26,0x3D, 0x65,0xB5,0xD9,0xEE,0x42,0x9C,0xA1,0x11,0xBD,0x63,0x5E |
| 7 | 0x9A,0x4A,0x26,0x22, 0x65,0xB5,0xD9, 0x32,0xD6,0x76,0x5B,0xCD,0x29,0x89,0xA4 |
| 8 | 0x9A,0x4A,0x26,0x60, 0x65,0xB5,0xD9, 0x9F,0xE1,0x73,0x75,0x60,0x1E,0x8C,0x8A |
| 9 | 0x9A,0x4A,0x26,0x6B, 0x65,0xB5,0xD9,0xA2,0x71,0xC4,0x3C,0x5D,0x8E,0x3B,0xC3 |
| 10 | 0x9A,0x4A,0x26,0xFA, 0x65,0xB5,0xD9,0x04,0x95,0xEB,0xD8,0xEB,0x6A,0x14,0x27 |
| 11 | 0x9A,0x4A,0x26,0x6C, 0x65,0xB5,0xD9,0x71,0x22,0x66,0x38,0x8E,0xDD,0x99,0xC7 |
| 12 | 0x9A,0x4A,0x26,0x18, 0x65,0xB5,0xD9,0x5B,0xA2,0xF6,0x95,0xA4,0x5D,0x09,0x6A |
| 13 | 0x9A,0x4A,0x26,0x14, 0x65,0xB5,0xD9, 0xCC,0x31,0x97,0xC3,0x33,0xCE,0x86,0x3C |
| 14 | 0x9A,0x4A,0x26,0xD0, 0x65,0xB5,0xD9,0xB1,0xCA,0xFB,0xA6,0x4E,0x35,0x04,0x59 |
| 15 | 0x9A,0x4A,0x26,0xB4, 0x65,0xB5,0xD9,0x56,0xA6,0xBA,0x79,0xA9,0x59,0x45,0x86 |

FIG. 5

STATUS NOTIFICATION METHOD, OPTICAL MODULE, NETWORK DEVICE, AND NETWORK SYSTEM

CROSS-REFERENCE TO RELATED APPLICATIONS

This is a continuation of International Patent Application No. PCT/CN2021/139424 filed on Dec. 18, 2021, which claims priority to Chinese Patent Application No. 202110021317.3 filed on Jan. 8, 2021 and Chinese Patent Application No. 202110363540.6 filed on Apr. 2, 2021. All of the aforementioned patent applications are hereby incorporated by reference in their entireties.

TECHNICAL FIELD

This disclosure relates to a network communication technology, and in particular, to a status notification method, an optical module, a network device, and a network system.

BACKGROUND

With the popularization of mobile intelligent terminals and personal computers, Internet has become a part of people's work and life. Generally, most data is transmitted in plaintext on a local area network. Therefore, a large quantity of security risks exist. For example, bank account information is stolen or tampered with, and malicious network attacks occur. Therefore, to ensure security of network data transmission has become a basic requirement of enterprise customers and individual customers. In a current network security technology that is widely used, a data encryption technology is an important means to ensure network security. The data encryption technology may be applied to an application layer, a transport layer, a network layer, a data link layer, or a physical layer of an Open System Interconnection (OSI) model.

In the field of data encryption technologies, how to implement reliability of data encryption at the physical layer is a technical problem that a person skilled in the art concerns.

SUMMARY

This disclosure provides a status notification method, an optical module, a network device, and a network system, to implement reliability of data encryption at a physical layer.

A first aspect of this disclosure provides a status notification method. The method includes determining a lock status of a logical lane in a first optical module, where the first optical module belongs to a first network device, and the lock status includes a locked state or an unlocked state, and sending, by the first network device or the first optical module, uplink notification information when the lock status indicates that the logical lane in the first optical module is locked, where the uplink notification information is used to enable a second optical module to determine that the logical lane in the first optical module is locked, the second optical module belongs to a second network device, and the first optical module is connected to the second optical module. The logical lane in the first optical module is generated by performing bit multiplexing on a physical lane of the optical module.

In the foregoing method according to this disclosure, when it is determined that the logical lane in the first optical module is locked, the uplink notification information is sent, so that the second optical module of a communication peer end determines that the logical lane in the first optical module is locked. In this way, only after the logical lane in the first optical module is locked, the second optical module may perform an operation such as encryption on data to be sent to the first optical module, or perform an operation such as decryption on data received from the first optical module. Therefore, reliability of data encryption at a physical layer is improved.

Optionally, the method further includes obtaining downlink notification information, where the downlink notification information is used to enable the first optical module to determine that a logical lane in the second optical module is locked.

Optionally, after the logical lane in the first optical module is locked and the logical lane in the second optical module is locked, the first optical module encrypts data sent to the second optical module, or the first optical module decrypts data received from the second optical module.

According to the foregoing method, only after the logical lane in the second optical module is locked, the first optical module may perform the operation such as encryption on the data to be sent to the second optical module, or perform the operation such as decryption on data received from the first optical module. In combination with the operation of the second optical module, the reliability of the data encryption at the physical layer can be further improved.

Optionally, the lock status of the logical lane in the first optical module may be determined by the first optical module, or the processing component of the first network device may obtain, from the first optical module, the lock status of the logical lane in the first optical module.

In this disclosure, the lock status of the logical lane in the first optical module may be determined by the first optical module or the processing component of the first network device to which the first optical module belongs. Therefore, flexibility of the foregoing method according to this disclosure is improved.

Optionally, logical lanes in the first optical module include M transmitting logical lanes and M receiving logical lanes, M is greater than or equal to 1, and determining a lock status of a logical lane in a first optical module includes determining a status of each transmitting logical lane in the M transmitting logical lanes, and/or determining a status of each receiving logical lane in the M receiving logical lanes.

In this disclosure, the status of each transmitting logical lane or each receiving logical lane in the first optical module may be determined, so that the obtained status of the logical lane in the first optical module is more accurate.

In an implementation, that the logical lane in the first optical module is locked includes that the M transmitting logical lanes are all locked, and/or the M receiving logical lanes are all locked. In this case, the first optical module sends M pieces of first uplink notification information to the second optical module respectively over the M transmitting logical lanes, where each piece of first uplink notification information in the M pieces of first uplink notification information indicates that a transmitting logical lane for sending the first uplink notification information is locked, and/or indicates that a receiving logical lane corresponding to the transmitting logical lane of the first uplink notification information is locked. Alternatively, the processing component of the first network device sends second uplink notification information to a processing component of the second network device, where the second uplink notification information indicates that the M transmitting logical lanes and/or the M receiving logical lanes of the first optical module are all locked.

The uplink notification information in this disclosure may be sent by the first optical module, or may be sent by the first network device. When the uplink notification information is sent by the first optical module, the first optical module sends one piece of first uplink notification information over each transmitting logical lane of the M transmitting logical lanes. The second optical module may receive M pieces of first uplink notification information in total. The second optical module may know, based on the M pieces of first uplink notification information, that the logical lanes in the first optical module are all locked (based on configuration, which may mean that the transmitting logical lanes and/or the receiving logical lanes are all locked). When the uplink notification information is sent by the first network device, the first network device may send only one piece of second uplink lane information, where the second uplink lane information includes information indicating that the transmitting logical lanes and/or the receiving logical lanes of the first optical module are all locked. The information may be a flag, or tunnel identifiers of all the transmitting logical lanes and/or the receiving logical lanes.

In this disclosure, the uplink notification information is sent by the first optical module or the first network device. Therefore, the implementation is more flexible.

In another implementation, that the logical lane in the first optical module is locked includes one or more of the following: one of the M transmitting logical lanes is locked, one of the M receiving logical lanes is locked, and one of the M transmitting logical lanes and a corresponding receiving logical lane are locked.

In this case, the first optical module sends first uplink notification information to the second optical module over j transmitting logical lanes, where the first uplink notification information indicates that the j transmitting logical lanes are locked, that receiving logical lanes corresponding to the j transmitting logical lanes are locked, or that the j transmitting logical lanes and the corresponding receiving logical lanes are locked, j is greater than 1 and less than M, and when the j transmitting logical lanes include a plurality of transmitting logical lanes, each transmitting logical lane corresponds to one piece of first uplink notification information. Alternatively, the processing component of the first network device sends third uplink notification information to a processing component of the second network device, where the third uplink notification information indicates that j transmitting logical lanes are locked, that receiving logical lanes corresponding to the j transmitting logical lanes are locked, or that the j transmitting logical lanes and the corresponding receiving logical lanes are locked, and j is greater than 1 and less than M.

In this disclosure, the first optical module or the first network device sends the uplink notification information. The first uplink notification information sent by the first optical module may be carried in a bit stream of the physical layer. The second uplink notification information and the third uplink notification information sent by the first network device may be carried in a layer 2 Ethernet frame or an Internet Protocol (IP) data packet. Therefore, the implementation is more flexible.

Optionally, each piece of first uplink notification information (a piece of first uplink notification information sent over any one of the M transmitting logical lanes) includes an identifier of a transmitting logical lane for sending the first uplink notification information, and a lock flag.

Optionally, the first uplink notification information is an alignment marker. The alignment marker may be, for example, a standard alignment marker corresponding to 200 gigabits (Gb)/400 Gb, or an alignment marker in another specified format, and the alignment marker can be used to determine whether the logical lane is locked. The lock flag is obtained by modifying a specified field in the alignment marker. Optionally, the specified field is a $UP_x$ field in the 200 Gb/400 Gb alignment marker.

According to the foregoing implementation of this disclosure, only the standard alignment marker is required to be modified. The implementation can be compatible with an existing method, be easily implemented, and ensure that no additional bandwidth is added in a data transmission process.

Optionally, the lock flag repeatedly appears in the $UP_x$ field. To be specific, the $UP_x$ field carries a plurality of lock flags. This manner can avoid a bit error in the transmission process, and ensure that the second optical module can accurately obtain the status of the first optical module.

In an implementation, the first optical module receives M pieces of first downlink notification information over the M receiving logical lanes, where the M pieces of first downlink notification information indicate that a logical lane in the second optical module is locked. Alternatively, the processing component of the first network device receives second downlink notification information sent by the processing component of the second network device, and sends the second downlink notification information to the first optical module, where the second downlink notification information indicates that a logical lane in the second optical module is locked.

In another implementation, the first optical module receives first downlink notification information over p receiving logical lanes in the M receiving logical lanes, where the first downlink notification information indicates that transmitting logical lanes and receiving logical lanes that are of the second optical module and that correspond to the p receiving logical lanes are locked, p is greater than 1 and less than M, and when the p receiving logical lanes include a plurality of receiving logical lanes, each receiving logical lane corresponds to one piece of first downlink notification information. Alternatively, the processing component of the first network device receives third downlink notification information sent by the processing component of the second network device, and sends the third downlink notification information to the first optical module, where the third downlink notification information indicates that transmitting logical lanes and receiving logical lanes that are of the second optical module and that correspond to p receiving logical lanes are locked, and p is greater than 1 and less than M.

In this disclosure, the first optical module may further obtain the status of the logical lane in the second optical module. A specific manner may include that the first optical module directly receives the first downlink notification information, or the first optical module receives the second downlink notification information or the third downlink notification information by using the processing module of the first network device. For a transmission mode of the first downlink notification information, refer to the first uplink notification information. For transmission modes of the second downlink notification information and the third downlink notification information, refer to the second uplink notification information and the third uplink notification information.

The first optical module and the second optical module in this disclosure may obtain the lock status of the logical lane of each other, and perform corresponding processing when the lock status meets a preset rule. Therefore, reliability of data processing (including encryption and decryption) can be improved. In addition, in this disclosure, the status of each logical lane may be separately determined, without considering interference caused by a status of another logical lane. Therefore, processing overheads are reduced. In this disclosure, when the first uplink notification information and the downlink notification information are transmitted by using the alignment marker specified in a standard, network bandwidth is not increased, so that waste of bandwidth resources can be avoided.

A second aspect of this disclosure provides an optical module, where the optical module is the first optical module in the first aspect, and includes a status determining unit and a notification unit. The status determining unit is configured to determine a lock status of a logical lane in the first optical module, where the first optical module belongs to a first network device, and the lock status includes a locked state or an unlocked state. The notification unit is configured to send uplink notification information when the lock status indicates that the logical lane in the first optical module is locked, where the uplink notification information is used to enable a second optical module to determine that the logical lane in the first optical module is locked, the second optical module belongs to a second network device, and the first optical module is connected to the second optical module.

Optionally, the status determining unit is further configured to obtain downlink notification information, where the downlink notification information is used to enable the status determining unit to determine that a logical lane in the second optical module is locked.

Optionally, the first optical module further includes an encryption/decryption unit configured to, after the logical lane in the first optical module is locked and the logical lane in the second optical module is locked, encrypt data sent to the second optical module, or decrypt data received from the second optical module.

Optionally, logical lanes in the first optical module include M transmitting logical lanes and M receiving logical lanes. The status determining unit is configured to determine a status of each transmitting logical lane in the M transmitting logical lanes, and/or determine a status of each transmitting logical lane in the M transmitting logical lanes.

Optionally, that the logical lane in the first optical module is locked includes that the M transmitting logical lanes are all locked, and/or the M receiving logical lanes are all locked. In this case, the notification unit is configured to send M pieces of first uplink notification information to the second optical module respectively over the M transmitting logical lanes, where each piece of first uplink notification information in the M pieces of first uplink notification information indicates that a transmitting logical lane for sending the first uplink notification information is locked, and/or indicates that a receiving logical lane corresponding to the transmitting logical lane of the first uplink notification information is locked, or send second uplink notification information to a processing component of the first network device, so that the processing component of the first network device sends the second uplink notification information to a processing component of the second network device, where the second uplink notification information indicates that the M transmitting logical lanes and/or the M receiving logical lanes of the first optical module are all locked.

Optionally, that the logical lane in the first optical module is locked includes one or more of the following: one of the M transmitting logical lanes is locked, one of the M receiving logical lanes is locked, and one of the M transmitting logical lanes and a corresponding receiving logical lane are locked. In this case, the notification unit is configured to send first uplink notification information to the second optical module over j transmitting logical lanes, where the first uplink notification information indicates that the j transmitting logical lanes are locked, that receiving logical lanes corresponding to the j transmitting logical lanes are locked, or that the j transmitting logical lanes and the corresponding receiving logical lanes are locked, j is greater than 1 and less than M, and when the j transmitting logical lanes include a plurality of transmitting logical lanes, each transmitting logical lane corresponds to one piece of first uplink notification information, or send third uplink notification information to a processing component of the first network device, so that the processing component of the first network device sends the third uplink notification information to a processing component of the second network device, where the third uplink notification information indicates that j transmitting logical lanes are locked, that receiving logical lanes corresponding to the j transmitting logical lanes are locked, or that the j transmitting logical lanes and the corresponding receiving logical lanes are locked, and j is greater than 1 and less than M.

Optionally, when the notification unit sends the first uplink notification information, the first uplink notification information includes an identifier of a transmitting logical lane for sending the first uplink notification information, and a lock flag.

Optionally, the first uplink notification information is an alignment marker, and the lock flag is obtained by modifying a specified field in the alignment marker.

Optionally, the first optical module is an optical module with a 200 Gb or higher rate, the specified field is a $UP_x$ field in the 200 Gb/400 Gb alignment marker, and the lock flag repeatedly appears in the $UP_x$ field.

Optionally, when obtaining the downlink notification information, the status determining unit is configured to receive M pieces of first downlink notification information over the M receiving logical lanes, where the M pieces of first downlink notification information indicate that a logical lane in the second optical module is locked, or receive second downlink notification information sent by the processing component of the first network device, where the second downlink notification information indicates that a logical lane in the second optical module is locked.

Optionally, when obtaining the downlink notification information, the status determining unit is configured to receive first downlink notification information over p receiving logical lanes in the M receiving logical lanes, where the first downlink notification information indicates that transmitting logical lanes and receiving logical lanes that are of the second optical module and that correspond to the p receiving logical lanes are locked, p is greater than 1 and less than M, or receive third downlink notification information sent by the processing component of the first network device, where the third downlink notification information indicates that transmitting logical lanes and receiving logical lanes that are of the second optical module and that correspond to p receiving logical lanes are locked, and p is greater than 1 and less than M.

The status determining unit, the notification unit, and the encryption/decryption unit may be independent components, or may be integrated in one component. For example, the optical module further includes an N:M bit multiplexer and an M:K bit multiplexer. The N:M bit multiplexer is configured to convert N physical lane signals into M logical lane signals, and the M:K bit multiplexer is configured to convert M logical lane signals into K logical lane signals. An encryption/decryption component is provided between the N:M bit multiplexer and the M:K bit multiplexer. The encryption/decryption component includes the foregoing status determining unit, the notification unit, and the encryption/decryption unit.

The foregoing encryption/decryption component is disposed between the N:M bit multiplexer and the M:K bit multiplexer, so that a process in which the optical module performs the method according to the first aspect of this disclosure is invisible to the outside. An existing device is modified slightly.

In this disclosure, the foregoing status determining unit, the notification unit, and the encryption/decryption unit may be implemented by using software or hardware.

A third aspect of this disclosure provides a network device. The network device includes a processing component and a first optical module. The first optical module is the optical module according to the second aspect and the implementations of the second aspect. The processing component is configured to obtain, from the first optical module, a lock status of a logical lane in the first optical module, and send uplink notification information to a second network device when the lock status indicates that the logical lane in the first optical module is locked, where the uplink notification information indicates that the logical lane in the first optical module is locked.

Optionally, the uplink notification information is the second uplink notification information in the foregoing first aspect. The second uplink notification information indicates that the M transmitting logical lanes and/or the M receiving logical lanes of the first optical module are all locked.

Alternatively, the uplink notification information is the third uplink notification information in the foregoing second aspect. The third uplink notification information indicates that j transmitting logical lanes of the first optical module are locked, that receiving logical lanes corresponding to the j transmitting logical lanes are locked, or that the j transmitting logical lanes and the corresponding receiving logical lanes are locked, and j is greater than 1 and less than M.

Optionally, the processing component is further configured to receive downlink notification information sent by the second network device, and send the downlink notification information to the first optical module.

Optionally, the downlink notification information is the second downlink notification information in the foregoing first aspect, where the second downlink notification information indicates that the logical lane in the second optical module is locked (which may be that the M receiving logical lanes and the M transmitting logical lanes are all locked), or the downlink notification information is the third downlink notification information in the foregoing first aspect, where the third downlink notification information indicates that transmitting logical lanes and receiving logical lanes that are of the second optical module and that correspond to p receiving logical lanes are locked, and p is greater than 1 and less than M.

The second optical module belongs to the second network device, and the second optical module is connected to the first optical module.

A fourth aspect of this disclosure provides a network system, including a first network device and a second network device. The first network device is the network device according to the third aspect and any implementation of the third aspect, and the first network device is configured to implement related steps in the method according to the first aspect. Functions of the second network device and the first network device are the same.

A fifth aspect of this disclosure provides a logic circuit. When the logic circuit runs, functions implemented by the first optical module in the first aspect and the implementations in the first aspect of this disclosure can be implemented. The logic circuit may be integrated into the optical module according to the second aspect and the implementations of the second aspect in this disclosure.

A sixth aspect of this disclosure provides a chip. The chip may include the logic circuit provided in the fifth aspect.

For beneficial effects of the second to the sixth aspects in this disclosure, refer to the descriptions on beneficial effects of the first aspect and the implementations of the first aspect.

BRIEF DESCRIPTION OF DRAWINGS

To describe the technical solutions in some embodiments of this disclosure more clearly, the following briefly describes the accompanying drawings for describing some embodiments.

FIG. 4 shows a structure of an alignment marker used in a 200 Gb/400 Gb lane;

FIG. 5 shows a structure of an alignment marker of each logical lane of a 400 Gb lane;

DESCRIPTION OF EMBODIMENTS

This disclosure provides an encryption method, to improve reliability of encryption at a physical layer. This disclosure may be applied to a physical layer of Ethernet. An Ethernet protocol is described below with reference to FIG. 1A and FIG. 1B.

Figure 1A:
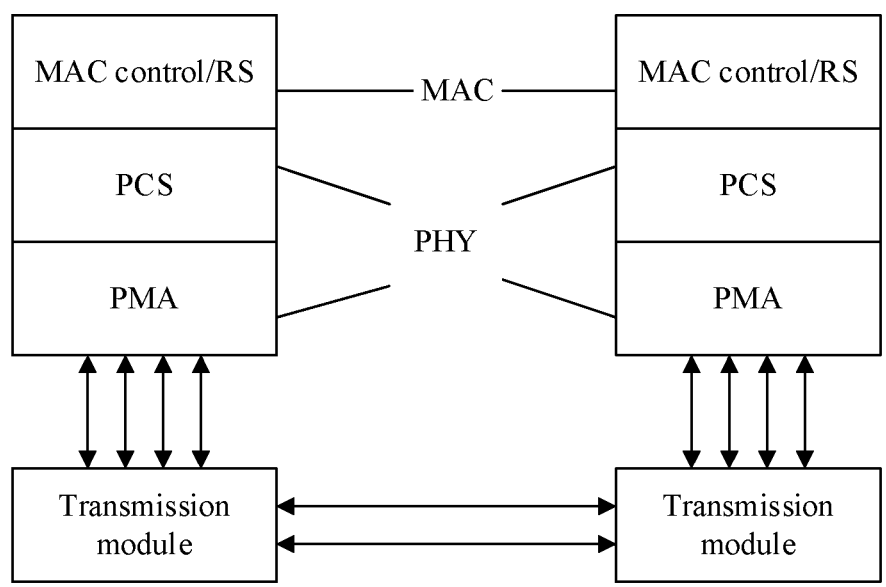
FIG. 1A is a schematic diagram of a structure of an Ethernet protocol.

FIG. 1A is a schematic diagram of a structure of an Ethernet protocol. The Ethernet includes a physical layer (PHY) and a MAC) layer. The physical layer includes a transmission module and a PHY entity. The transmission module includes a transmission medium, and the transmission medium is used to transmit data. The transmission medium may be, for example, an electrical cable or an optical module. The optical module is connected to an optical fiber.

Figure 1B:
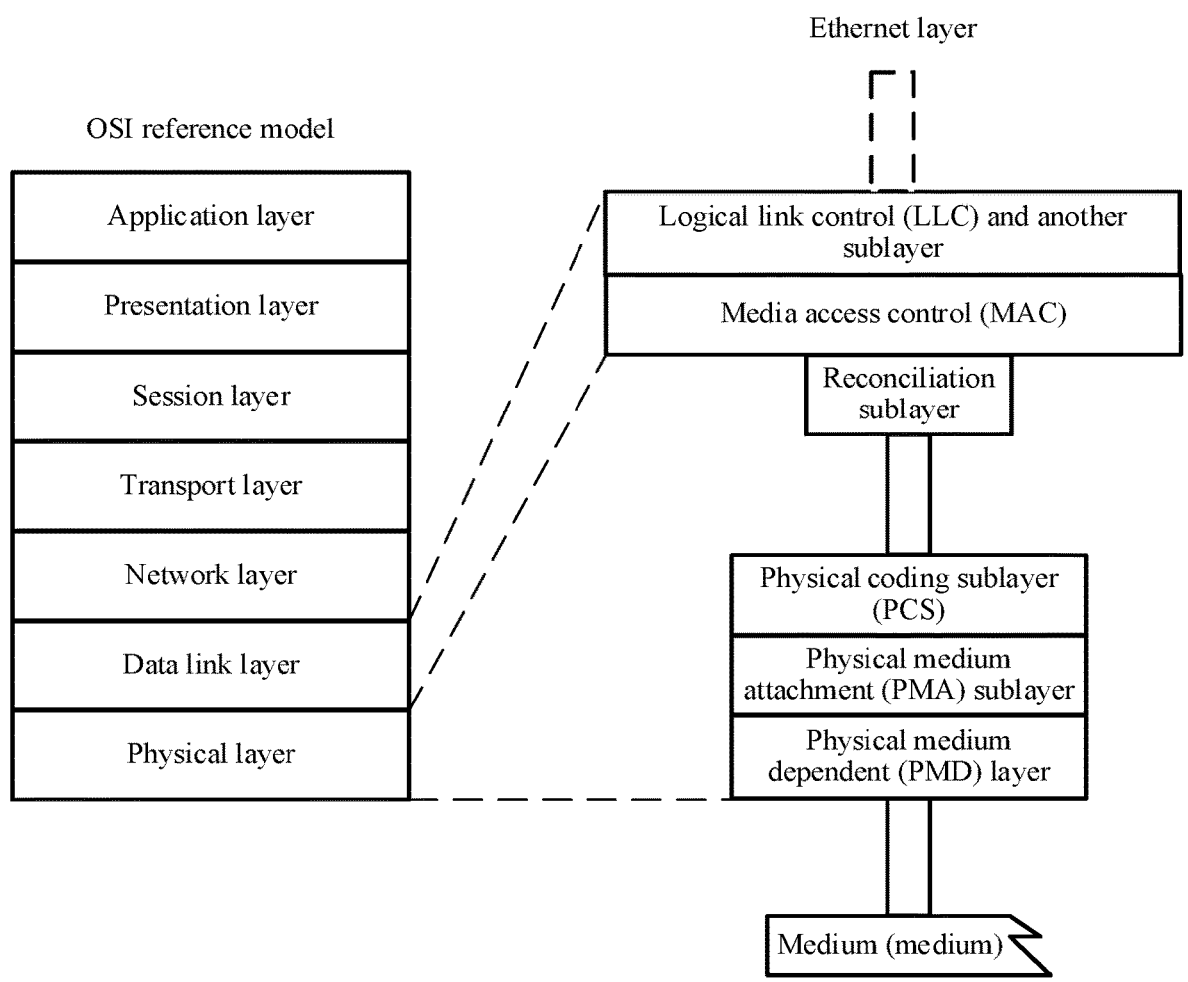
FIG. 1B is a schematic diagram of correspondences of layers in an Ethernet protocol and an OSI reference model.

The foregoing PHY entity includes a physical medium dependent (PMD) sublayer, a physical medium attachment (PMA) sublayer, and a physical coding sublayer (PCS). The MAC layer of the Ethernet mainly includes a MAC control sublayer and a reconciliation sublayer (RS). FIG. 1B shows correspondences of layers of an open systems interconnection reference model, and the MAC layer and the PHY layer of the Ethernet. A data link layer of the OSI reference model corresponds to a function of the reconciliation sublayer of the MAC layer, and a physical layer of the OSI reference model corresponds to the PHY layer and the reconciliation sublayer of the MAC layer. A MAC/PHY architecture can support data transmission at a plurality of rates. Different transmission rates require different transmission media and media independent interfaces (MII).

Figure 2A:
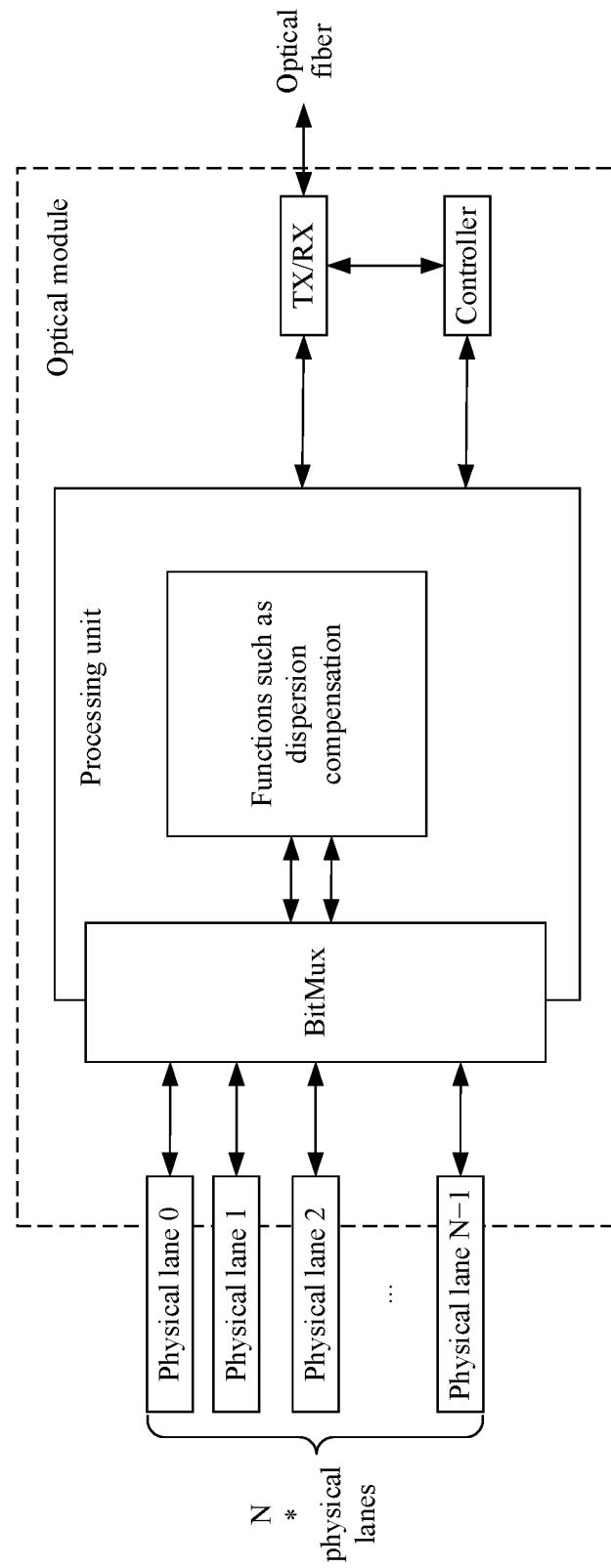
FIG. 2A is a schematic diagram of a structure of an optical module according to this disclosure.
Figure 2B:
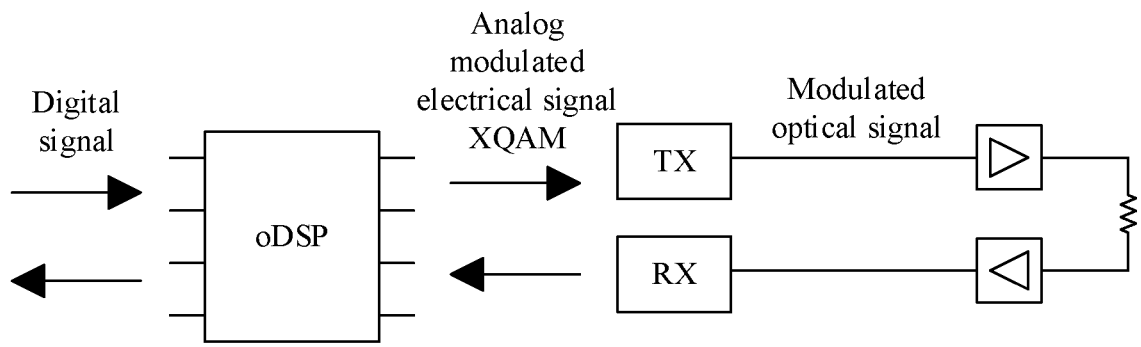
FIG. 2B is a schematic diagram of an operating circuit of an optical digital signal processing chip.

With the development of networks, more and more network devices communicate with each other by using optical fibers for transmission, and an optical module has become a very important component. FIG. 2A is a schematic diagram of a structure of an optical module. The optical module includes an optoelectronic transceiver (TX/RX), a controller, and a processing unit. The controller is configured to control the optoelectronic transceiver and the processing unit to perform various operations. The controller may be a micro-controller unit (MCU). The processing unit may be configured to encode and decode a digital signal/analog signal, and perform compensation for a plurality of costs in a transmission link, for example, dispersion compensation in long-distance transmission. The processing unit may further include a bit multiplexer/demultiplexer (referred to as BitMux). The BitMux is configured to map signals received over N physical lanes to an internal processing lane in the processing unit. There may be one or more internal processing lanes. The processing unit may be, for example, an optical digital signal processor (oDSP). FIG. 2B is a schematic diagram of an operating circuit of the oDSP. In a transmit direction, a digital signal is processed by the oDSP and converted into an analog modulated electrical signal by using a modulation algorithm. The modulation algorithm may be cross-quadrature amplitude modulation (XQAM). The analog modulated electrical signal is processed by an optical transmitter (TX), and is then converted into a modulated optical signal, and the modulated optical signal is sent. In a receive direction, the optical signal is processed by an optical receiver, and is then converted into an analog modulated electrical signal. The analog modulated electrical signal is processed by the oDSP and is then converted into a digital signal.

In a communication process, when a network device serves as a transmitting end, the network device receives data, and a MAC layer of the network device forms an Ethernet frame based on a received data stream. Then, the Ethernet frame is sent to a PCS. The PCS performs code block encoding on the data, and sends encoded data to a plurality of logical lanes in the PCS. The encoded data is sent to a PMA over the plurality of logical lanes. After performing bit multiplexing (bit mux) on the data of the plurality of logical lanes, the PMA distributes the data to one or more physical lanes. The data on the one or more physical lanes is processed by a PMD sublayer, and is then converted into an analog signal. Then, the analog signal is sent to a transmission medium through a media dependent interface (MDI). Processing in the receive direction is in reverse to that in the transmit direction.

The foregoing logical lanes may also be referred to as virtual lanes, and in this disclosure, are referred to as PCS lanes or forward error correction (FEC) lanes (referred to as the FEC lanes in a 100 Gb standard, and the PCS lanes in a 200 Gb/400 Gb standard). These lanes are generally distributed inside an implementation unit of the PCS. For example, in a 200 Gb Ethernet, eight PCS lanes or FEC lanes are specified, in a 400 Gb Ethernet, 16 logical lanes are specified, and in a 100 Gb Ethernet, four logical lanes are specified. The foregoing physical lane means a PMA lane. One physical lane may carry data of one or more logical lanes. In the 100 Gb/200 Gb/400 Gb high-speed Ethernet, a quantity of physical lanes varies based on different implementations.

Figure 3:
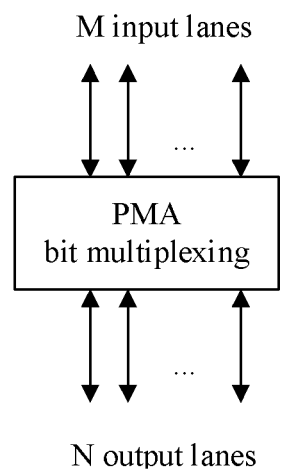
FIG. 3 is a schematic diagram of a bit multiplexing process.

The foregoing bit multiplexing is a function, applicable to counting of all input/output lanes and transmission in all directions. Data streams/data bits received over m input lanes may be sent to n output lanes in a bit interleaving mode. For example, when m:n=4:2, bit streams of every two input lanes are interleaved into a bit stream of one output lane. FIG. 3 is a schematic diagram of a bit multiplexing process. In FIG. 3, bit multiplexing is performed on signal streams of four input lanes at a PMA sublayer, and signal streams obtained through the bit multiplexing are sent to two output lanes.

When data is transmitted over different logical lanes and physical lanes, to ensure that a receiving end may align a plurality of logical lanes (that is, determine that code group boundaries of data received over the logical lanes are the same), an alignment marker (AM) is designed in the Institute of Electrical and Electronics Engineers (IEEE) 802.3 standard. When distributing a serial stream to a plurality of PCS lanes, a PCS at a transmitting end periodically inserts AMs into a data stream of each PCS lane. The receiving end performs AM lock based on the AMs of each lane (that is, locks a lane corresponding to the AMs), so that a plurality of signals are combined into one serial signal. Formats of alignment markers corresponding to different transmission rates (100 gigabits per second (Gb/s), 200 Gb/s, 400 Gb/s, and the like) may be different. Formats of AMs in 200 Gb/s and 400 Gb/s are shown in FIG. 4. $CM_0$, $CM_1$, $CM_2$, $CM_3$, $CM_4$, and $CM_5$ are common markers of all logical lanes, and $UM_0$, $UM_1$, $UM_2$, $UM_3$, $UM_4$, and $UM_5$ are used to uniquely identify a logical lane, that is, different logical lanes have different combinations of "$UM_0$, $UM_1$, $UM_2$, $UM_3$, $UM_4$, and $UM_5$". $UP_0$, $UP_1$, and $UP_2$ fields are editable by a user. Lengths of AMs in 200 Gb and 400 Gb are 120 bits, and the bits are arranged at 0 to 119 positions. In this case, $\{CM_0, CM_1, CM_2\}$, $\{CM_3, CM_4, CM_5\}$, $\{UM_0, UM_1, UM_2\}$, and $\{UM_3, UM_4, UM_5\}$ each occupy 24 bits, and $\{UP_0\}$, $\{UP_1\}$, and $\{UP_2\}$ each occupy 8 bits. According to the IEEE 802.3, 200 Gb corresponds to eight logical lanes, and 400 Gb corresponds to 16 logical lanes. The 400 Gb lanes are used as an example, and an encoding structure of an alignment marker of each logical lane is shown in FIG. 5. $CM_0$ to $CM_5$ are divided into 12 symbols, and each symbol occupies 4 bits (namely, a nibble, nibble). The receiving end compares $CM_0$ to $CM_5$ in a received AM with $CM_0$ to $CM_5$ in FIG. 5. Only when the received AM has less than or equal to 3 nibbles that do not match those of $CM_0$ to $CM_5$ in FIG. 5, a logical lane may be locked, and a logical lane number may be correctly identified.

To ensure communication security of the Ethernet, an encryption protocol MACsec is proposed in this field. The encryption protocol MACsec runs at a MAC layer, and can implement integrity and confidentiality of connectionless data based on a media access independent protocol. MACsec uses the Advanced Encryption Standard (AES) for encrypting groups by using a symmetric key, to generate encrypted data. Grouping means that plaintext is divided into different groups. Lengths of all group are the same. One group of data is encrypted at one time until the entire plaintext is encrypted. The length of the group may be 128 bits, 192 bits, 256 bits, or the like. When encrypting a group of data, MACsec divides the grouping data into frames, and encrypts each frame to obtain an encrypted frame. Each encrypted frame carries a 16-byte integrity check value (ICV) and a 12-byte initialization vector (IV). When an average frame length is 64 bytes, encryption based on MACsec occupies (16+12)/64=43% of user bandwidth. It can be learned that when MACsec is used to encrypt an Ethernet frame, related encryption information needs to be added to the Ethernet frame, and a large amount of user bandwidth is occupied.

Figure 6:
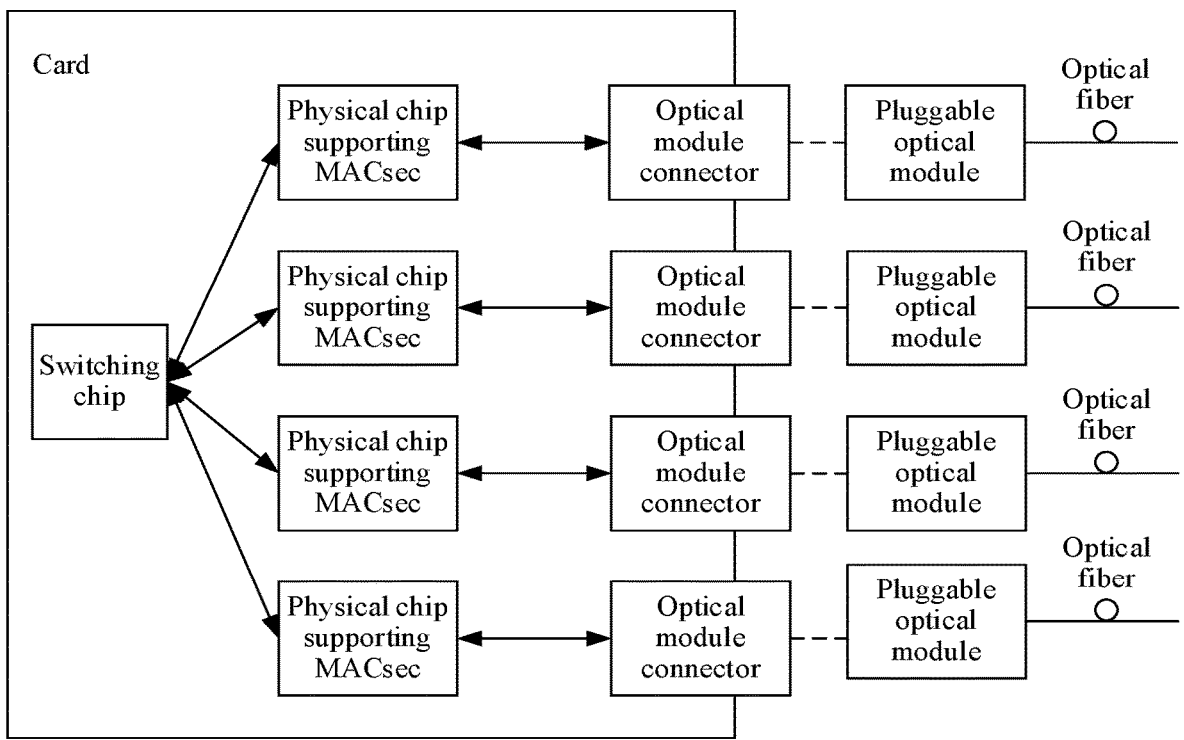
FIG. 6 is a schematic diagram of an architecture for implementing a media access control (MAC) security (MACsec) function according to this disclosure.

In recent years, as capacity of network devices is doubled, power consumption brings more challenges to heat dissipation and power supply, and customers have a stronger requirement for power consumption reduction. With accelerated promotion of high performance computing and artificial intelligence (AI), more attention is paid to a network delay. Although MACsec implements data encryption and decryption based on an Ethernet data link layer (layer 2), with an improvement in system capacity and an increase in port bandwidth, a high-speed and large-capacity chip requires increasingly higher power consumption to implement the MACsec function. In addition, impact of a delay of a new service becomes more obvious. As shown in FIG. 6, a physical chip supporting a MACsec function is usually disposed outside a switching chip of a network device in the industry. Optionally, the MACsec function may also be implemented by the switching chip. The switching chip may be deployed on a card (or a line card).

However, the implementation is closely related to board hardware, regardless of whether the implementation is based on the physical chip or the switching chip. Therefore, the implementation fails to meet a requirement of a customer for implementing MACsec encryption and decryption based on an existing conventional board. In addition, in site application, a port encryption requirement of a user (an individual or entity that has purchased and used a network device) changes dynamically and is hard to be predicted. For example, a demand at time of purchasing the network device can be met provided that there are eight fixed ports supporting the MACsec function. If more MACsec ports are required in subsequent application, it is necessary to update hardware and increase investment. If MACsec ports on the purchased network device are far more than ports that are actually needed, excessive investment may occur. Therefore, for an existing conventional hardware system or a dynamic change in the site application, this solution fails to meet the requirement of the customer.

Figure 7:
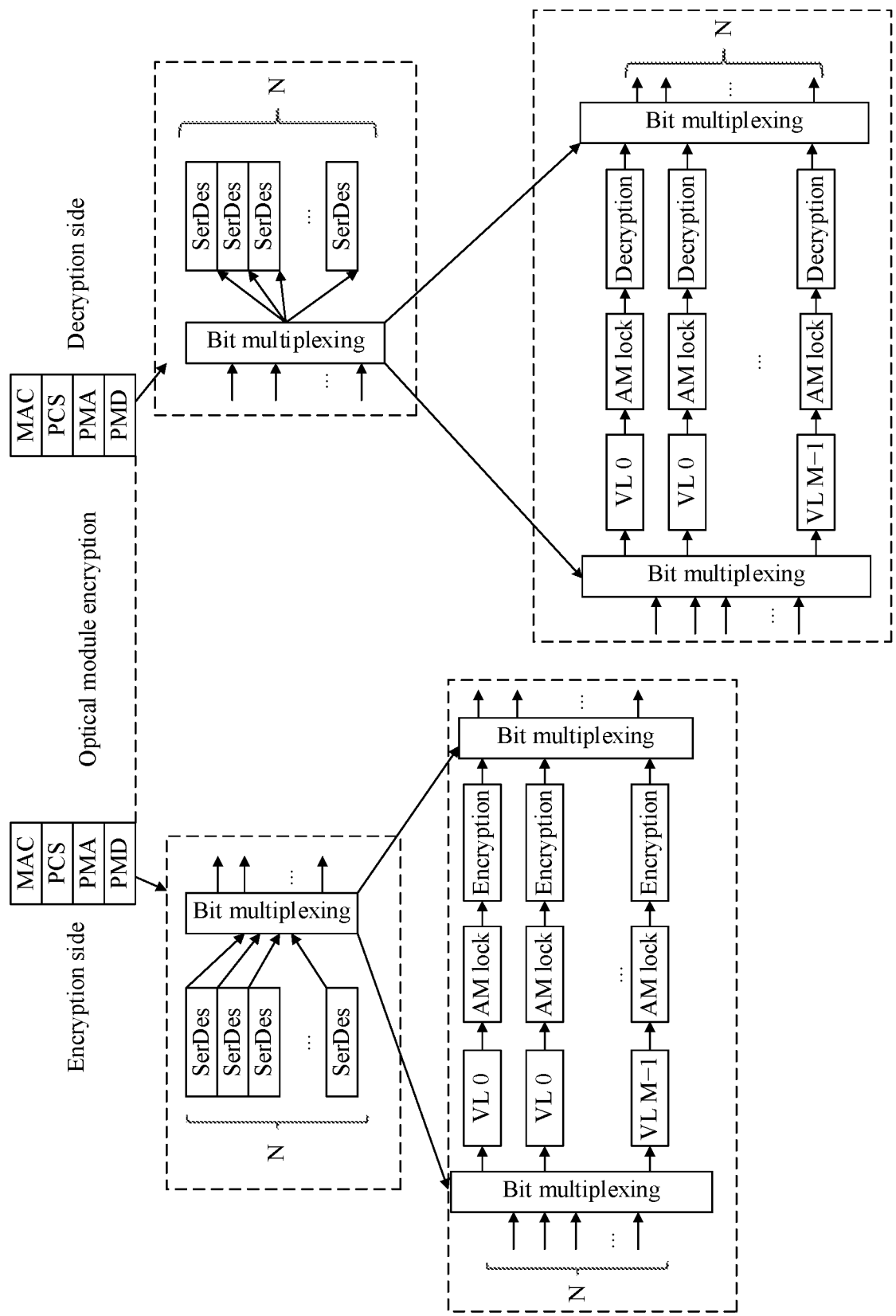
FIG. 7 shows an optical module encryption solution according to this disclosure.

For the foregoing problem, an optical module encryption solution shown in FIG. 7 is provided in this disclosure. Because an optical module may be independent of a board, a user only needs to purchase an optical module supporting encryption, and a new encryption requirement can be met. In the solution in FIG. 7, a modifiable field of an AM is used to carry an encryption parameter, without adding extra bandwidth. The foregoing modifiable field may be, for example, one or more of fields $UP_0$, $UP_1$, and $UP_2$ (which are collectively referred to as a $UP_x$ field in this disclosure) in a 200 Gb or 400 Gb AM. Optionally, when it is allowed to increase bandwidth, padding information may be inserted at a specific position of a data stream to carry the encryption parameter. Similarly, before encryption, it is ensured that AM lock has been completed at both an encryption side device and a decryption side. The AM lock means that when two consecutive AMs are found from a data stream on a logical lane, and the two consecutive AMs match AMs of the lane (that is, the two consecutive AMs are the same as the AMs of the lane or a comparison result of the two consecutive AMs and the AMs of the lane meets a matching rule), it is considered that the lane is locked. After the lane is locked, an operation (for example, inserting the encryption parameter or aligning lanes) may be performed on the data stream in the lane. Alignment is used to compensate for a deviation caused by transmission over different lanes, so that a receiving end performs corresponding processing only after receiving a complete data block from the lanes.

Figure 8:
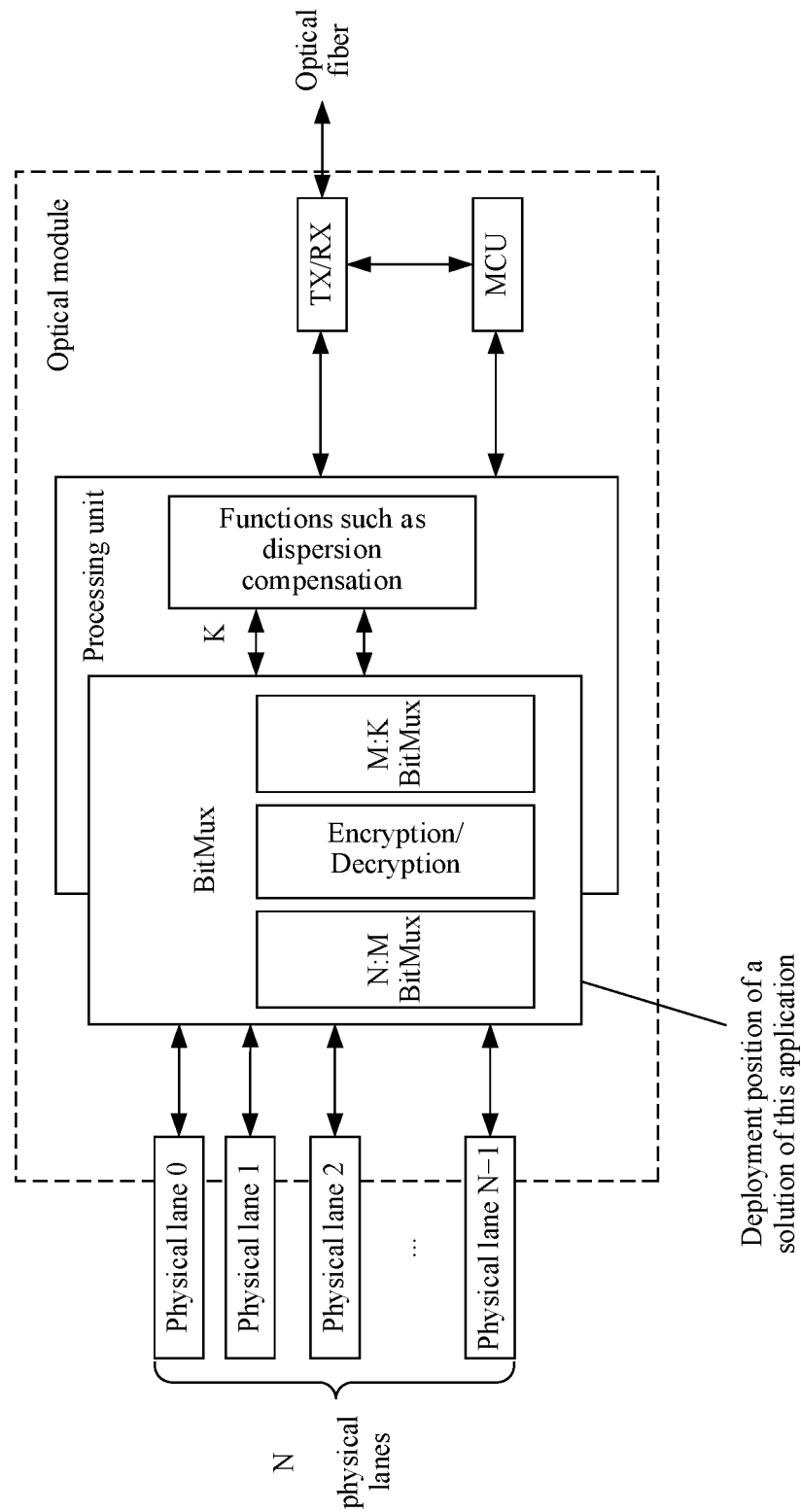
FIG. 8 is a schematic diagram of a structure of an optical module according to this disclosure.

To implement the optical module encryption solution shown in FIG. 7, an optical module is further provided in this disclosure. FIG. 8 is a schematic diagram of a structure of an improved optical module according to this disclosure. The optical module includes a controller, a processing unit, and TX/RX. Further, the optical module further includes BitMux to perform a bit multiplexing function. The BitMux may be deployed on or outside the processing unit. The BitMux may include two sub-bit multiplexing functions: N:M BitMux and M:K BitMux. N (N≥1) is a quantity of external physical lanes, M (M≥1) is a quantity of internal virtual lanes of the BitMux, and K (K≥1) is a quantity of physical lanes supported by the optical module. The BitMux further includes an encryption/decryption component. When the optical module is used in a transmitting end, the optical module receives N physical lane data streams transmitted by a PMD (or another electrical chip) at a physical layer. The N:M BitMux converts the N physical lane data streams input to the optical module into M logical lane data streams. The encryption/decryption component identifies an AM of each logical lane from the M logical lane data streams, adds an encryption parameter to the AM of each logical lane, and encrypts a data message to obtain encrypted M data streams. Then, the M:K BitMux multiplexes the encrypted M logical lane data streams to K data streams at K physical lanes of the processing unit. The processing unit performs algorithm processing (for example, dispersion compensation preprocessing, optionally) on the K data streams. Then, processed K data streams are converted into optical signals by the TX, and the optical signals are sent to another optical module. When applied to a receiving end, the optical module receives an optical signal from another optical module, where the optical signal carries an encrypted data stream. The optical signal is converted into an electrical signal by the RX. The processing unit performs algorithm processing (for example, dispersion compensation) on the electrical signal to obtain a digital signal, and sends the digital signal to the M:K BitMux over the K physical lanes. The M:K BitMux converts K physical lane data streams into M logical lane data streams. The encryption/decryption component identifies AMs in the M logical lane data streams, obtains encryption parameters in the data streams, decrypts the M logical lane data streams to obtain decrypted M data streams, and sends the decrypted M data streams to the N:M BitMux over the M logical lanes. The N:M BitMux converts the received M logical lane data streams into N physical lane data streams, and transmits the N physical lane data streams to the PMD or another electrical chip at the physical layer.

Similarly, before the encryption solution shown in FIG. 7 is used for encryption, it is ensured that AM lock has been completed at both the encryption side device and the decryption side device, to make sure that data is correctly transmitted. Therefore, a mechanism is required to ensure that both the encryption side device and the decryption side device perform an encryption/decryption operation on the data only after the AM lock is completed. Therefore, how to determine whether the AM lock has been completed at both the encryption side device and the decryption side device is a vital technology. Correspondingly, this disclosure provides a status notification method and a related apparatus, to enable a network device (that is, a device located at either end of a lane, which may be the encryption side device or the decryption side device) to obtain an AM lock status of the lane, and determine, based on the AM lock status of the lane, whether an encryption/decryption operation can be performed. The AM lock status of the lane may be AM lock statuses of all lanes between devices at both ends, or an AM lock status of one lane. When a device at one end of the lane is a local end, a device at the other end of the lane is a peer end. Correspondingly, the AM lock status of the lane includes that a local end AM is not locked, and a peer end AM is not locked, a local end AM is not locked, and a peer end AM is locked, a local end AM is locked, and a peer end AM is not locked, and a local end AM is locked, and a peer end AM is locked.

Figure 9:
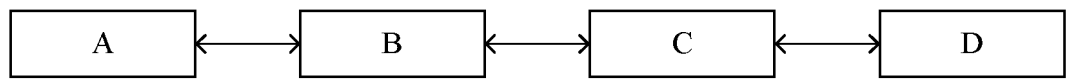
FIG. 9 is a schematic diagram of an application scenario of a status notification method according to this disclosure.

The status notification method according to this disclosure may be applied to a scenario shown in FIG. 9. In FIG. 9, an edge node A is connected to an edge node D through intermediate nodes B and C. Based on the Ethernet, the edge node A is connected to the intermediate node B, the intermediate node B is connected to the intermediate node C, and the intermediate node C is connected to the edge node D. For any two directly connected nodes, the status notification method in this disclosure is applicable.

Figure 10A:
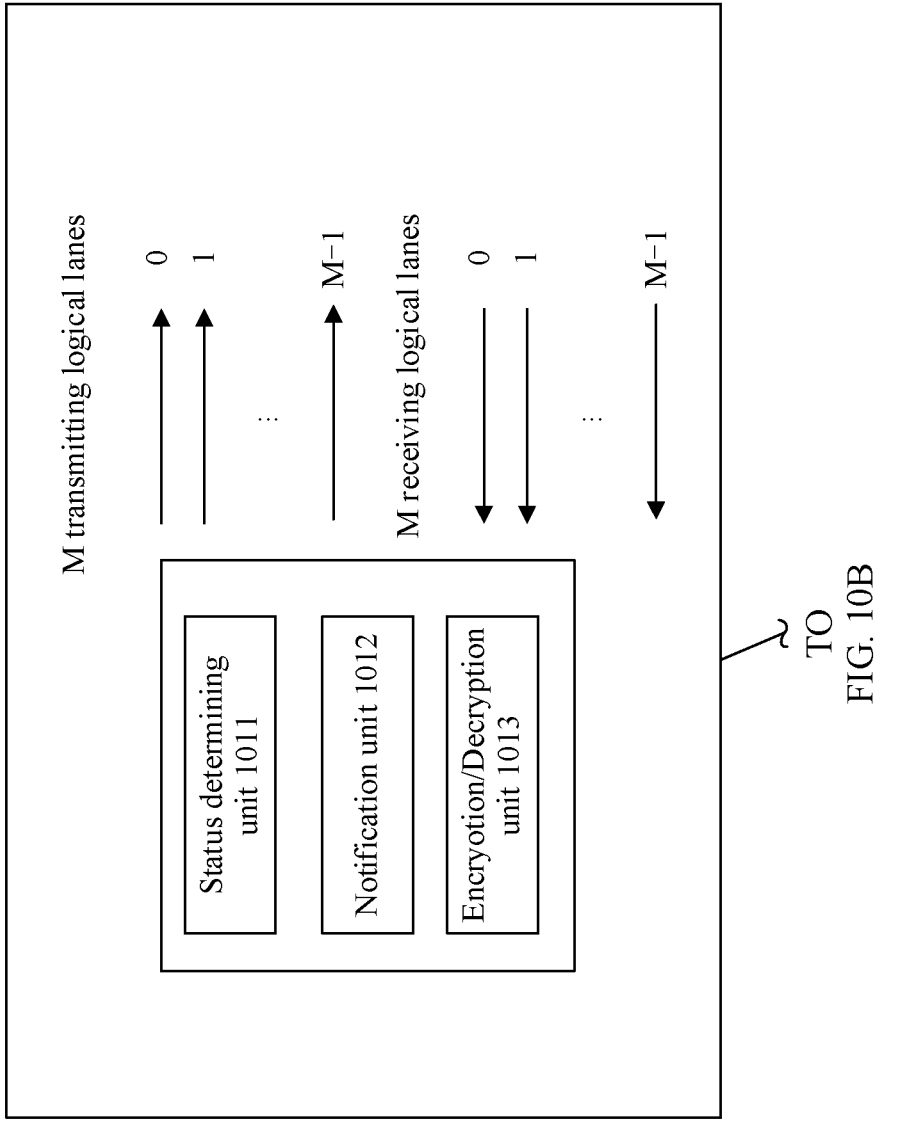
FIG. 10A, FIG. 10B, and FIG. 10C are a schematic diagram of a structure of a network system according to this disclosure.
Figure 10B:
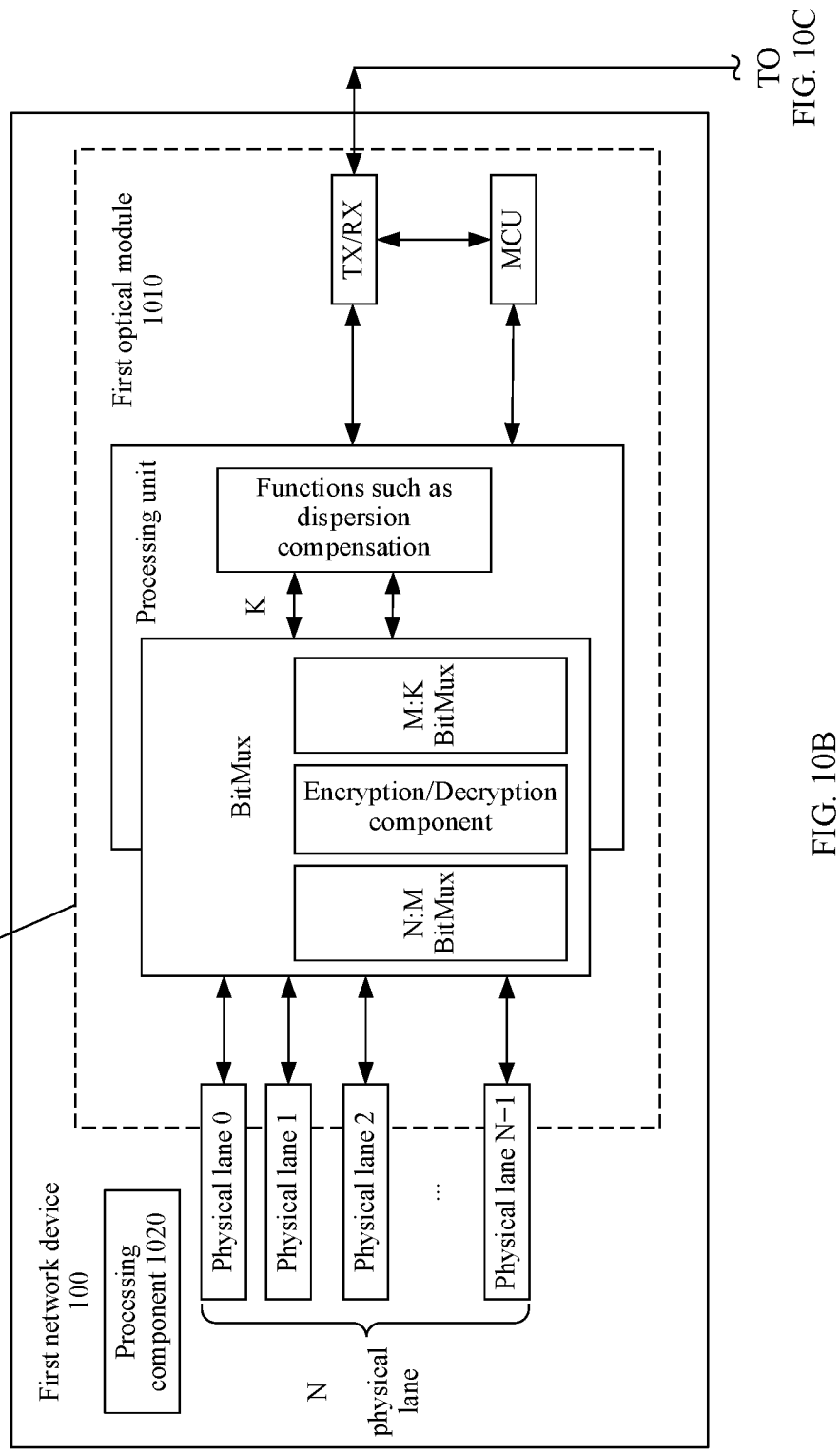
Figure 10C:
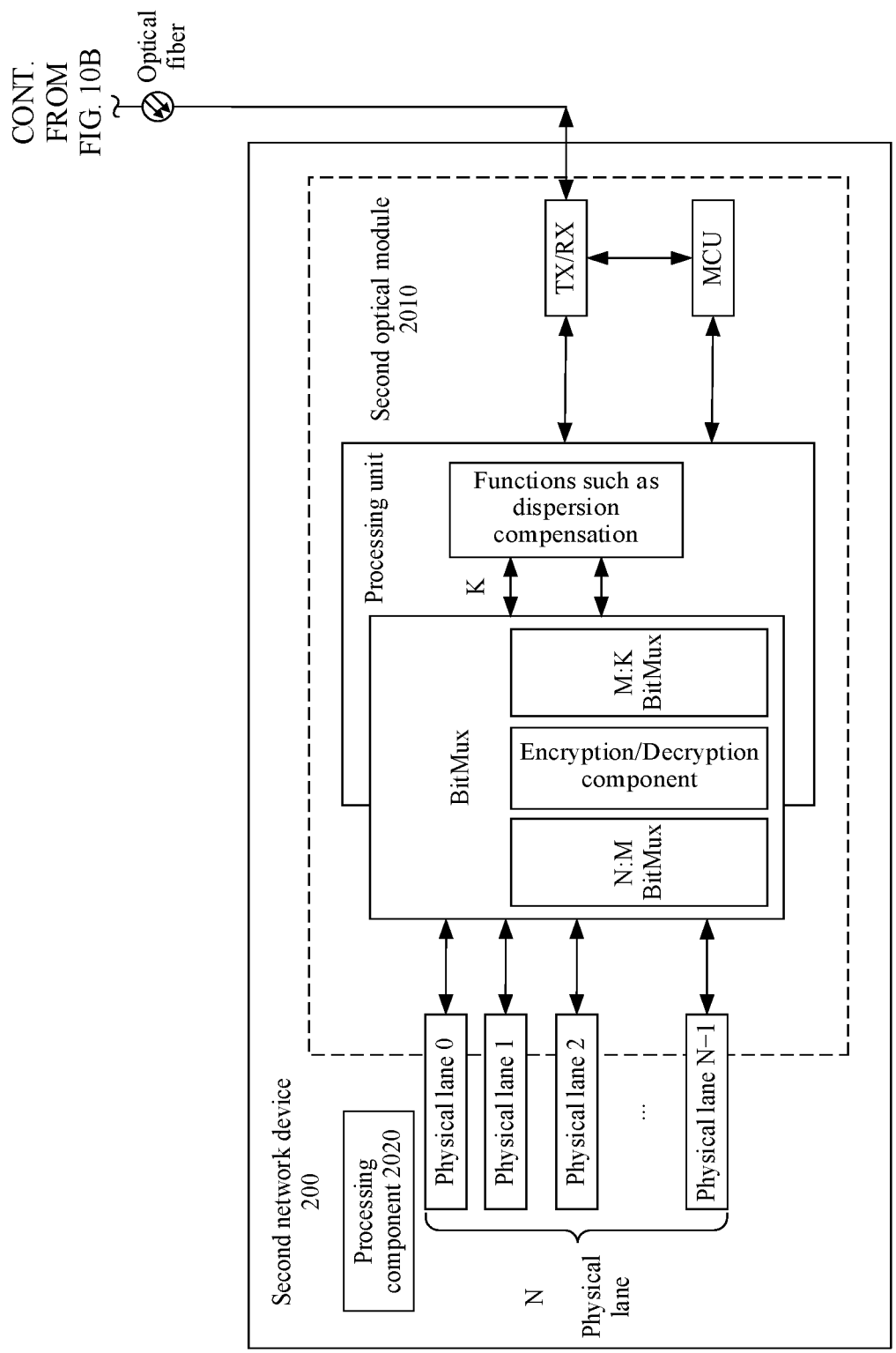

Based on the optical module shown in FIG. 8, two directly connected network devices are used as an example in FIG. 10A to FIG. 10C to describe a network system according to this disclosure. As shown in FIG. 10A to FIG. 10C, the network system includes a first network device 100 and a second network device 200. The first network device 100 and the second network device 200 may be any two of the nodes in FIG. 9. The first network device 100 includes a first optical module 1010, and the second network device includes a second optical module 2010. The first optical module 1010 of the first network device 100 is connected to the second optical module 2010 of the second network device 200. An encryption/decryption component of the first optical module 1010 further includes a status determining unit 1011, a notification unit 1012, an encryption/decryption unit 1013, M logical lanes (or transmitting logical lanes in this disclosure) in a transmit direction, and M logical lanes (or receiving logical lanes in this disclosure) in a receive direction. The second optical module 2010 and the first optical module 1010 have similar structures and functions. For brevity, this disclosure merely shows a schematic diagram of a structure of the encryption/decryption component in the first optical module 1010. Implementations of the status determining unit 1011, the notification unit 1012, and the encryption/decryption unit 1013 are not limited in this disclosure.

The first optical module 1010 determines a lock status of a logical lane of the first optical module 1010, sends first uplink notification information to the second optical module 2010 of the second network device 200 after the logical lane of the first optical module 1010 is locked (for ease of description, in this disclosure, a direction from the first network device 100 to the second network device 200 is referred to as an uplink direction, a direction from the second network device 200 to the first network device 100 is referred to as a downlink direction, and correspondingly, notification information sent from the first network device 100 to the second network device 200 is referred to as uplink notification information, and notification information sent from the second network device 200 to the first network device 100 is referred to as downlink notification information), or triggers a processing component 1020 (deployed outside the optical module 1010) of the first network device 100 to send second uplink notification information or third uplink notification information to the second network device. The first uplink notification information, the second uplink notification information, or the third uplink notification information is used to enable the second optical module 2010 to determine that the logical lane of the first optical module 1010 is locked. The first optical module 1010 or the second optical module 2010 performs a corresponding encryption/decryption operation only after determining that logical lanes of both a local end and a peer end are locked. When the first network device is used as an encryption side device, the second network device is used as a decryption side device, and vice versa. In this disclosure, for ease of description, with reference to FIG. 10A to FIG. 10C and FIG. 11, the following uses an example in which the first network device is a transmitting end (the encryption side device) and the second network device is a receiving end (the decryption side device) to describe a status notification method of this disclosure in detail.

Figure 11:
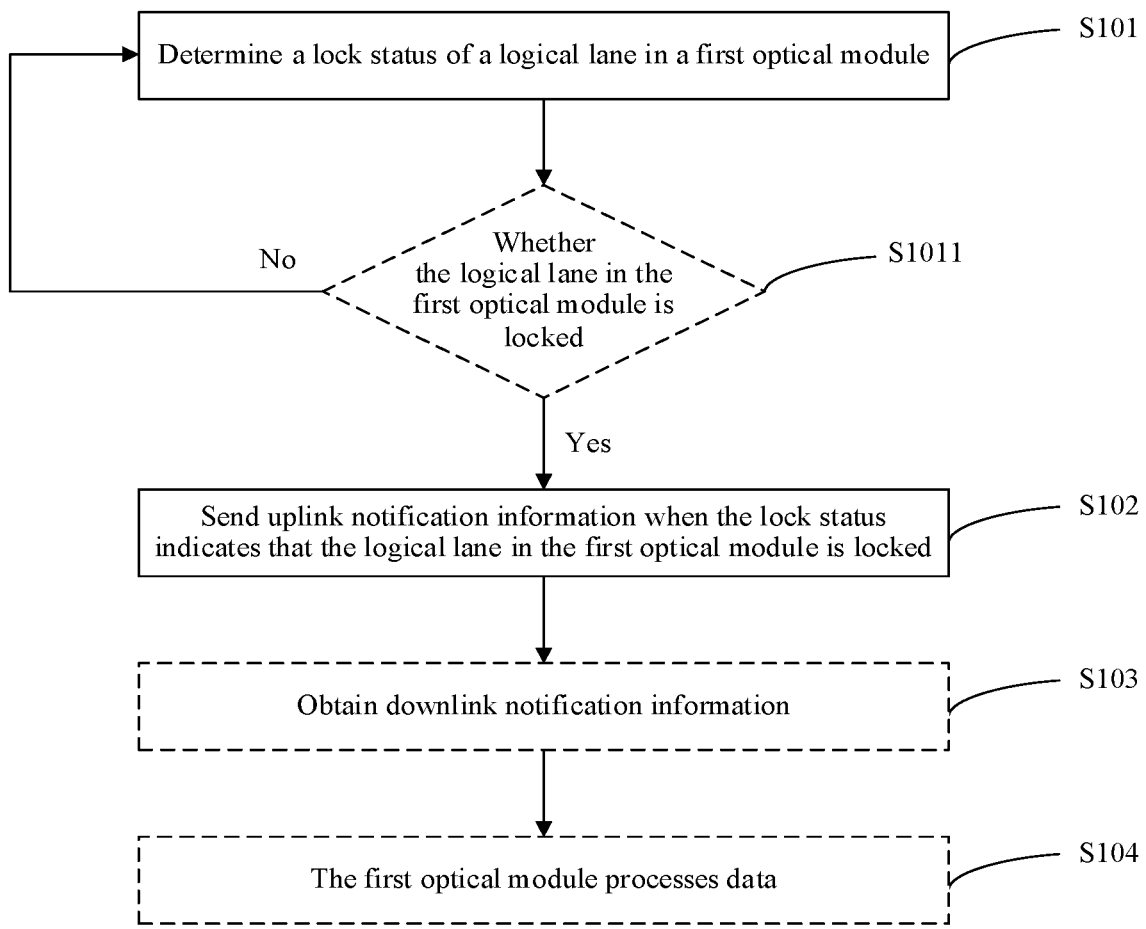
FIG. 11 is a schematic flowchart of a status notification method according to this disclosure.

FIG. 11 is a schematic flowchart of the status notification method according to this disclosure, and the method includes steps S101 to S104. The method is performed by the first optical module 1010 or the first network device 100 shown in FIG. 10A to FIG. 10C.

In step S101, a lock status of a logical lane in the first optical module is determined.

As described above, the first optical module 1010 receives N physical lane signals over the N physical lanes in FIG. 10A to FIG. 10C, and converts, by using N:M BitMux, the N physical lane signals into M logical lane signals that are respectively transmitted over the M transmitting logical lanes, where each logical lane signal includes alignment markers inserted at spacing by a PCS of the first network device 100. The first optical module receives K physical lane signals over the K physical lanes in FIG. 10A to FIG. 10C, and converts, by using M:K BitMux, the K physical lane signals into M logical lane signals that are respectively transmitted over the M receiving logical lanes, where each logical lane signal includes alignment markers inserted by a PCS of the second network device.

Because logical lanes in the first optical module include the M transmitting logical lanes and the M receiving logical lanes, the determining a lock status of a logical lane in the first optical module includes determining a status of each transmitting logical lane in the M transmitting logical lanes, or determining a status of each logical lane in the M transmitting logical lanes and the M receiving logical lanes. The status of each logical lane includes a locked state or an unlocked state. That the logical lane is locked means that alignment markers that meet a matching rule exist on the logical lane, and positions of the alignment markers can be accurately identified. After the logical lane is locked, data can be transmitted over the logical lane. That the logical lane is not locked means that the logical lane cannot be used to transmit data. Even if there is data in the logical lane, the data is considered invalid. Step S101 may be further performed by the status determining unit 1011 of the first optical module 1010.

The status determining unit 1011 of the first optical module 1010 determines the status of each transmitting logical lane in the M transmitting logical lanes in the following manner.

The status determining unit 1011 obtains a first alignment marker to be sent to a transmitting logical lane i, where i=1, . . . , and M. A format of the first alignment marker may be the same as that of an alignment marker used in a 200 Gb/400 Gb lane shown in FIG. 4.

The status determining unit 1011 determines the status of the transmitting logical lane i based on the first alignment marker, where the status of the transmitting logical lane i includes a locked state or an unlocked state.

The status determining unit 1011 of the first optical module 1010 determines the status of each receiving logical lane in the M receiving logical lanes in the following manner.

The status determining unit 1011 receives a second alignment marker over a receiving logical lane q, where q=1, . . . , and M. A format of the second alignment marker may be the same as that of the alignment marker used in the 200 Gb/400 Gb lane shown in FIG. 4. That is, formats of the second alignment marker and the first alignment marker are the same.

The status determining unit 1011 determines a status of the receiving logical lane q based on the second alignment marker, where the status of the receiving logical lane q includes a locked state or an unlocked state.

A method for determining the status of the transmitting logical lane i based on the first alignment marker is the same as a method for determining the status of the receiving logical lane q based on the second alignment marker. The following uses an example in which the status of the transmitting logical lane i is determined based on the first alignment marker to describe how to determine a status of a logical lane.

When the first alignment marker matches a reference alignment marker of the transmitting logical lane i, or the first alignment marker matches the reference alignment marker of the transmitting logical lane i, and a quantity of alignment markers that enter the transmitting logical lane i and that match the reference alignment marker of the transmitting logical lane i reaches a specified quantity, the transmitting logical lane i is locked. When the first alignment marker does not match a reference alignment marker of the transmitting logical lane i, or the first alignment marker does not match the reference alignment marker of the transmitting logical lane i, and a quantity of alignment markers that enter the transmitting logical lane i and that do not match the reference alignment marker of the transmitting logical lane i reaches a specified quantity, the transmitting logical lane i is not locked.

In this disclosure, a corresponding reference alignment marker is provided for each transmitting logical lane. The reference alignment marker may be an alignment marker specified in the IEEE 802.3 standard, or may be an alignment marker in another format used to determine whether a logical lane is locked. In a 400 Gb scenario, when M is 16, a reference alignment identifier of each logical lane may be shown in FIG. 5.

That the first alignment marker matches the reference alignment marker of the transmitting logical lane i means that the first alignment marker is the same as the reference alignment marker, that a quantity of bits that are of the first alignment marker and that are inconsistent with those of the reference alignment marker is less than or equal to a specified threshold (for example, values of two bits of the first alignment marker are allowed to be different from those of corresponding bits of the reference marker), or that a quantity of bits that are of the first alignment marker and that are the same as those of the reference alignment marker reaches a specified proportion (for example, values of 98% or more bits in the first alignment marker are the same as those of corresponding bits in the reference alignment marker).

Step S101 is performed, so that the first optical module 1010 (for example, the status determining unit 1011 of the first optical module 1010) determines the status of each logical lane in the M transmitting logical lanes and the M receiving logical lanes in first optical module. Further, the first network device 100 (for example, the processing component of the first network device 100) may also obtain, from the first optical module 1010, the lock status of each logical lane in the first optical module 1010. For example, the status determining unit 1011 of the first optical module 1010 may send the lock status of each logical lane to the first network device 100 in real time. The status determining unit 1011 of the first optical module 1010 may also send lock statuses of all the M transmitting logical lanes and the M receiving logical lanes to the first network device 100 at one time. The first network device 100 may also poll each logical lane of the first optical module 1010 to obtain the lock status of each logical lane in real time. A manner in which the first network device 100 obtains the lock status of the logical lane in the first optical module 1010 is not limited in this disclosure.

In step S102, uplink notification information is sent when the lock status indicates that the logical lane in the first optical module is locked.

The uplink notification information is used to enable the second optical module to determine that the logical lane in the first optical module is locked, the second optical module belongs to the second network device, and the first optical module is connected to the second optical module. Based on different scenarios, the uplink notification information may be first uplink communication information, second uplink notification information, or third uplink notification information, which is described in detail below.

After the first optical module 1010 or the first network device 100 obtains lock statuses of all logical lanes in the first optical module 1010, the first optical module 1010 or the first network device 100 determines, based on a preset rule, whether the logical lane in the first optical module is locked (step S1011). If the logical lane is not locked, step S101 is performed, and if the logical lane is locked, step S102 is performed.

The preset rule is used to determine whether the logical lane in the first optical module is locked. To be specific, when the preset rule is met, the logical lane in the first optical module is locked, and when the preset rule is not met, the logical lane in the first optical module is not locked. The preset rule includes any one or more of the following.

The M transmitting logical lanes are all locked, and/or the M transmitting logical lanes are locked, one of the M transmitting logical lanes is locked, one of the M receiving logical lanes is locked, and one of the M transmitting logical lanes and a corresponding receiving logical lane are locked.

When the preset rule is that one of the M transmitting logical lanes and a corresponding receiving logical lane are locked, because manners for numbering respective logical lanes of the first optical module and the second optical module may be different, mapping relationships need to be configured on the first optical module 1010 or the first network device 100. The mapping relationships record a correspondence between the transmitting logical lane and the receiving logical lane on the first optical module 1010. The mapping relationship may further include a correspondence between a transmitting logical lane and a receiving logical lane on the second optical module 2010. A represents a logical lane on the first optical module, B represents a logical lane on the second optical module, T represents a transmitting logical lane, R represents a receiving logical lane, and a numeral represents a logical lane number. For example, the mapping relationship may be shown in Table 1.

TABLE 1

| AT0 | AR1 | BT1 | BR2 |
| AT1 | AR3 | BT0 | BR1 |
| AT2 | AR2 | BT3 | BR3 |
| ... | ... | ... | ... |

Based on different preset rules, when the logical lane in the first optical module 1010 is locked, content of the sent uplink notification information may also be different. In addition, in this disclosure, the uplink notification information may be sent by the notification unit 1012 in the first optical module 1010, or the uplink notification information may be sent by the processing component 1020 in the first network device 100. Therefore, step S102 further includes the following implementations.

Manner 1: If the preset rule is that the M transmitting logical lanes are all locked, and/or the M receiving logical lanes are all locked, the first optical module 1010 sends, when the preset rule is met, M pieces of first uplink notification information to the second optical module 2010 respectively over the M transmitting logical lanes. That is, one piece of first uplink notification information is sent over one transmitting logical lane, where each piece of first uplink notification information indicates that the transmitting logical lane for sending the first uplink notification information is locked, and/or indicates that a receiving logical lane corresponding to the transmitting logical lane of the first uplink notification information is locked.

Manner 2: If the preset rule is that the M transmitting logical lanes are all locked, and/or the M transmitting logical lanes and the M receiving logical lanes are all locked, when the preset rule is met, the processing component 1020 of the first network device sends, second uplink notification information to a processing component 2020 of the second network device, where the second uplink notification information indicates that the M transmitting logical lanes of the first optical module are all locked and/or the M receiving logical lanes are all locked.

Manner 3: If the preset rule is that one of the M transmitting logical lanes is locked, one of the M receiving logical lanes is locked, or one of the M transmitting logical lanes and a corresponding receiving logical lane are locked, when the preset rule is met, it is assumed, that j transmitting logical lanes in the M transmitting logical lanes are locked, receiving lanes corresponding to the j transmitting logical lanes are locked, or the j transmitting logical lanes and the corresponding logical lanes are locked. The first optical module 1010 sends first uplink notification information to the second optical module over the j transmitting logical lanes, where the first uplink notification information indicates that the j transmitting logical lanes are locked, that receiving logical lanes corresponding to the j transmitting logical lanes are locked, or that the j transmitting logical lanes and the corresponding receiving logical lanes are locked, j is greater than 1 and less than M, and when the j transmitting logical lanes includes a plurality of transmitting logical lanes, each transmitting logical lane corresponds to one piece of first uplink notification information.

Manner 4: If the preset rule is that one or more of the M transmitting logical lanes are locked, one or more of the M receiving logical lanes are locked, or one or more of the M transmitting logical lanes and corresponding receiving logical lanes are locked, when the preset rule is met, it is assumed, that j transmitting logical lanes in the M transmitting logical lanes are locked, receiving lanes corresponding to the j transmitting logical lanes are locked, or the j transmitting logical lanes and the corresponding logical lanes are locked. The processing component 1020 of the first network device 100 sends third uplink notification information to a processing component 2020 of the second network device 200, where the third uplink notification information indicates that the j transmitting logical lanes are locked, that the receiving lanes corresponding to the j transmitting logical lanes are locked, or that the transmitting logical j and the corresponding receiving logical lanes are locked, and j is greater than 1 and less than M.

In the foregoing implementations, the first uplink notification information, the second uplink notification information, or the third uplink information may indicate lock of a logical lane in different scenarios. The information may be configured as required to indicate a scenario of logical lane lock.

In an implementation, a format of the first uplink notification information in the foregoing manner 1 is the same as that of the first uplink notification information in the foregoing manner 3. Each piece of first uplink notification information includes an identifier of a transmitting logical lane for sending the first uplink notification information, and a lock flag. The lock flag indicates that the transmitting logical lane of the first uplink notification information is locked. First uplink notification information transmitted over different transmitting logical lanes includes different lane identifiers. The first uplink notification information transmitted over the different transmitting logical lanes may include a same lock flag. When the first uplink notification information is an alignment marker, the lock flag is obtained by modifying a specified field in the alignment marker. The lock flag may appear for one time or repeatedly for a plurality of times. When the lock flag appears repeatedly for a plurality of times, it can ensure that a receiving end correctly identifies the lock flag. The foregoing first uplink notification information may be obtained by modifying the alignment marker shown in FIG. 4 or FIG. 5, or may be obtained by modifying a specified field in an alignment marker of another format. For example, when the first optical module is a 200 Gb/400 Gb optical module, values of one or more fields of $UP_0$, $UP_1$, and $UP_2$ in the alignment marker (namely, the reference alignment marker) of the transmitting logical lane shown in FIG. 5 may be modified, so that modified $\{UP_0, UP_1, UP_2\}$ is used as a lock flag to indicate that one transmitting logical lane is locked, the M transmitting logical lanes are all locked, or the M transmitting logical lanes and the M receiving logical lanes are locked. Preferably, when the M transmitting logical lanes are all locked, and/or the M receiving logical lanes are all locked, lock flags of M pieces of first uplink communication information respectively transmitted over the M transmitting logical lanes are the same.

A format of the second uplink notification information in the foregoing manner 2 may be the same as or different from that of the third uplink notification information in the foregoing manner 4. The foregoing second uplink notification information and the third uplink notification information may be carried in a layer 2 Ethernet frame or an IP data packet. In the manner 2, the first network device 100 may notify, by using one piece of second uplink notification information, that the transmitting logical lanes are all locked/or the receiving logical lanes are all locked. In the manner 4, the first network device 100 may send the third uplink notification information when determining that one or more transmitting logical lanes are locked and one or more receiving logical lanes are locked, or determining that one transmitting logical lane and a corresponding receiving logical lane are locked.

By performing step S102, the first optical module 1010 or the first network device 100 may enable the second optical module 2010 to obtain lock statuses of logical lanes in the first optical module 1010.

When the notification unit 1012 in the first optical module 1010 sends the first uplink notification information, the status determining unit 1011 may determine whether the lock status of the logical lane in the first optical module 1010 meets the preset rule, and trigger, when the lock status of the logical lane in the first optical module 1010 meets the preset rule, the notification unit 1012 to send the first uplink notification information. Alternatively, the notification unit 1012 may determine, based on a lock status that is of the logical lane in the first optical module 1010 and that is detected by the status determining unit 1011, whether the lock status of the logical lane in the first optical module 1010 meets the preset rule.

In step S103, the first network device or the first optical module obtains downlink notification information, where the downlink notification information is used to enable the first optical module to determine that a logical lane in the second optical module is locked.

The downlink notification information is sent by the second network device 200 or the second optical module 2010. A generation condition and a sending mode of the downlink notification information are similar to those of the foregoing uplink notification information. Examples are as follows.

Scenario 1: The first optical module 1010 receives M pieces of first downlink notification information over the M receiving logical lanes, where the M pieces of first downlink notification information indicate that a logical lane in the second optical module 2010 is locked. That a logical lane in the second optical module 2010 is locked includes that M receiving logical lanes and M transmitting logical lanes of the second optical module 2010 are locked.

Scenario 2: The processing component 1020 of the first network device 100 receives second downlink notification information sent by the processing component 2020 of the second network device 200, and sends the second downlink notification information to the first optical module 1010, where the second downlink notification information indicates that a logical lane in the second optical module 2010 is locked. That a logical lane in the second optical module 2010 is locked includes that M receiving logical lanes and M transmitting logical lanes of the second optical module 2010 are locked.

Scenario 3: The first optical module 1010 receives first downlink notification information over p receiving logical lanes in the M receiving logical lanes, where the first downlink notification information indicates that transmitting logical lanes and receiving logical lanes that are of the second optical module 2010 and that correspond to the p receiving logical lanes are locked, p is greater than 1 and less than M, and when the p receiving logical lanes include a plurality of receiving logical lanes, each receiving logical lane corresponds to one piece of first downlink notification information.

Scenario 4: The processing component 1020 of the first network device 100 receives third downlink notification information sent by the processing component 2020 of the second network device 200, and sends the third downlink notification information to the first optical module 1010, where the second downlink notification information indicates that transmitting logical lanes and receiving logical lanes that are of the second optical module 2010 and that correspond to p receiving logical lanes are locked, and p is greater than 1 and less than M.

In this implementation, the second optical module 2010 is a receiving end, and the second optical module 2010 may return data to the first optical module 1010. This indicates that the receiving logical lane of the second optical module is definitely locked. Therefore, in the scenario 1 and the scenario 2, the M pieces of first downlink notification information and the second downlink notification information indicate that the M receiving logical lanes and the M transmitting logical lanes of the second optical module 2010 are all locked. In the scenario 3 and the scenario 4, the first downlink notification and the third downlink notification indicate that the transmitting logical lanes and receiving logical lanes that are of the second optical module 2010 and that correspond to the p receiving logical lanes are locked.

The first downlink notification information in the foregoing scenario 1 and the scenario 3 may be received by the status determining unit 1012 in the first optical module 1010. The second downlink notification information in the foregoing scenario 2 and the third downlink notification information in the foregoing scenario 4 may be received by the processing component 1020 in the first network device 100, and sent to the status determining unit 1012 in the first optical module 1010. The processing component 1020 may convert the second downlink notification information and the fourth downlink notification information into a format that can be recognized by the status determining unit 1012 of the first optical module 1010, and then send the converted second downlink notification information and the converted fourth downlink notification information. The foregoing second downlink notification information and the third downlink notification information may be carried in a layer 2 Ethernet frame or an IP data packet.

In step S104, after the logical lane in the first optical module is locked and the logical lane in the second optical module is locked, the first optical module processes data. Further, the first optical module encrypts data sent to the second optical module, or the first optical module decrypts data received from the second optical module. The processing may further include inserting handshake information into the data, and the like.

Step S104 may be performed by the encryption/decryption unit 1013 in the first optical module 1010, and the data encryption operation or the data decryption operation in step S104 is only a data processing manner. The first optical module 1010 may further include another processing unit. Correspondingly, step S104 may be replaced with another data processing operation.

According to the foregoing implementations of this disclosure, it can be ensured that only when the internal logical lanes in the first optical module and the second optical module are locked, the encryption/decryption operation or another operation is performed on data transmitted over the logical lanes. Therefore, reliability of data transmission is improved.

Figure 12:
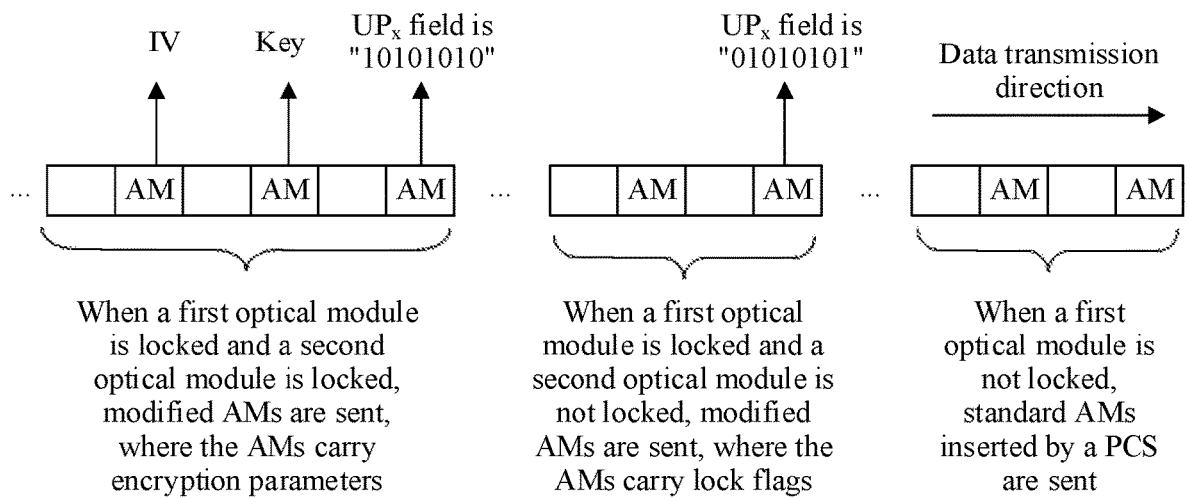
FIG. 12 is a schematic diagram of a data transmission process according to this disclosure.

The following describes application of the status notification method provided in embodiments of this disclosure with reference to the alignment marker formats in FIG. 4 and FIG. 5 and the schematic diagram of the data transmission process in FIG. 12. When the first network device 100 transmits data to the second network device 200, as shown in FIG. 12, the PCS of the first network device 100 periodically inserts AMs into a data stream, and the AMs inserted by the PCS are the standard AMs shown in FIG. 4 or FIG. 5. The status determining unit of the first optical module 1010 detects a status of each transmitting logical lane and each receiving logical lane of the first optical module in real time. When the data stream arrives at the first optical module 1010, the first optical module 1010 sends the data stream to the M transmitting logical lanes, identifies, for each transmitting logical lane and/or receiving logical lane, the AM in the data stream transmitted over the transmitting logical lane and/or the receiving logical lane, and determines, based on the AM, and a reference AM (the reference AM is the AM listed in FIG. 5) of the transmitting logical lane and/or the receiving logical lane, whether the logical lanes in the first optical module 1010 are locked, and determines whether the logical lanes in the second optical module are locked (for various implementations of whether the logical lanes in the first optical module 1010 and the second optical module 2010 are locked, refer to the description of the foregoing embodiments).

When the logical lane in the first optical module 1010 is not locked, the first optical module sends the standard AM inserted by the PCS (that is, the first optical module directly sends the AM without modifying the AM). When the logical lane in the first optical module 1010 is locked, and the logical lane in the second optical module is not locked, the first optical module modifies the obtained AM, so that modified AM carries a lock flag. For example, the AM is the AM shown in FIG. 5. The lock flag is obtained by modifying a $UP_x$ field in the AM shown in FIG. 5. The $UP_x$ field may be one or more of the $UP_0$, the $UP_1$, and the $UP_2$. The lock flag may occupy one or more bits, and a value of the lock flag may be set, for example, the lock flag may be "01" or "0011". To prevent the receiving end from incorrectly identifying the lock flag, the lock flag may be repeatedly transmitted (that is, the lock flag repeatedly appears in the AM). For example, in FIG. 12, if the lock flag is "01", values of $UP_0$, $UP_1$, and $UP_2$ are all "01010101". In this way, the lock flag may be transmitted for 12 times by using one AM, and a probability that the lock flag is incorrect is low. For example, it is assumed that a bit error rate of a logical lane is BER=1E^−4, and reliability per bit=1−BER, with 12 times redundancy, that is, a probability that a quantity of correct bits in 12 bits is greater than or equal to 7 is $P=\Sigma_{i=7}^{12}(_{12}^{i})(1-BER)^i BER^{12-i}$. A probability that an AM lock bit sequence is correct is $P^2$. A time periodicity in which the AMs appear on each lane is considered, and an error occurs in the bit sequence in about ten thousand years. Therefore, the reliability is high.

When the logical lane in the first optical module 1010 is locked, and the logical lane in the second optical module 2010 is also locked, the first optical module 101 modifies a first AM that is obtained after the logical lane is locked and that corresponds to the logical lane, so that the AM includes a multiframe flag. The multiframe flag indicates that data transmitted after the AM is processed data. The multiframe flag may occupy one or more bits, and the multiframe flag is different from the lock flag. The multiframe flag may also appear repeatedly in the AM, to improve transmission reliability. As shown in FIG. 12, if the multiframe is marked as "10", values of $UP_0$, $UP_1$, and $UP_2$ are all "01010101". An AM following the AM that includes the multiframe flag may include encryption information such as a key and an IV, so that after receiving a data stream, the second optical module 2010 decrypts the data stream based on the key and the IV.

Figure 13:
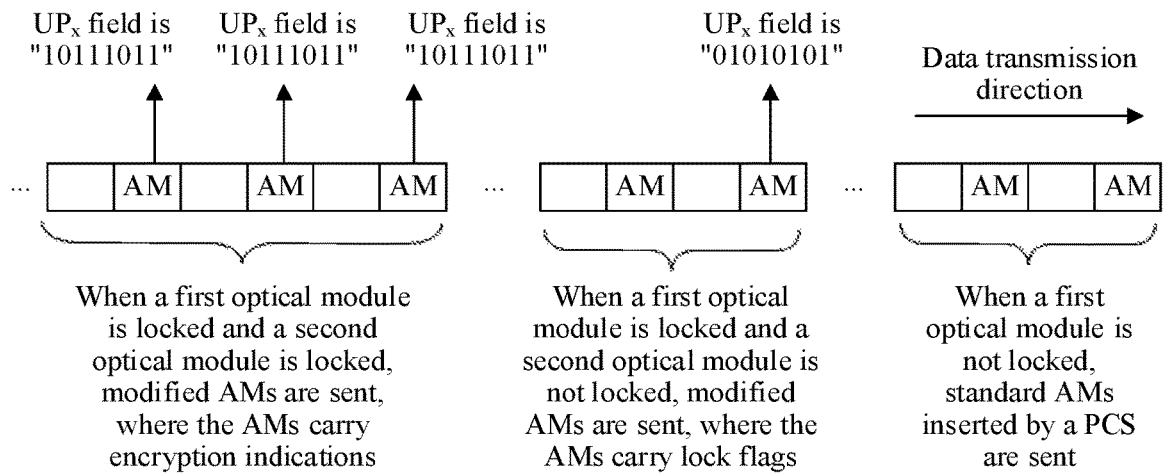
FIG. 13 is a schematic diagram of another data transmission process according to this disclosure.

FIG. 13 is a schematic diagram of another data transmission process according to this embodiment of this disclosure. Different from FIG. 12, FIG. 13 does not include a multiframe flag. When the logical lane in the first optical module 1010 is locked and the logical lane in the second optical module 2010 is also locked, the first optical module 1010 modifies each AM that is obtained after the logical lanes are locked and that corresponds to the logical lane, so that the AM includes an encryption flag. The encryption flag indicates that a data stream after the AM is an encrypted data stream. After receiving the data stream that includes the AM, the second optical module 2010 decrypts the data stream.

Further, the multiframe flag and the encryption flag in FIG. 12 and FIG. 13 may also be replaced with other information, so that the optical module implements more operations.

In the scenario shown in FIG. 7, when the manner shown in FIG. 12 or FIG. 13 is used to transmit data, the lock status of the logical lane in the optical module may be indicated without increasing the transmission bandwidth of the network device. The optical module performs encryption/decryption or another operation after the logical lanes at the local end and the peer end are locked, thereby improving operation reliability.

The encryption/decryption component in the first optical module 1011 in this disclosure may be implemented by software, or may be implemented by hardware. When implemented by hardware, the encryption/decryption component may be implemented by an independent chip, or may be implemented by a logic circuit. The chip or the logic circuit may be integrated into the optical module.

"A plurality of" mentioned in embodiments of this disclosure means two or more. The term "and/or" describes an association relationship for describing associated objects and represents that three relationships may exist. For example, A and/or B may represent the following three cases: only A exists, both A and B exist, and only B exists. The character "/" generally indicates an "or" relationship between the associated objects.

In the specification, claims, and accompanying drawings of this disclosure, the terms "first", "second", and so on are intended to distinguish between similar objects but do not necessarily indicate a specific order or sequence. It should be understood that the descriptions termed in such a manner are interchangeable in proper cases so that embodiments can be implemented in another order than the order illustrated or described in this disclosure. In addition, the terms "include", "contain" and any other variants mean to cover the non-exclusive inclusion, for example, a process, method, system, product, or device that includes a list of steps or modules is not necessarily limited to those steps or modules, but may include other steps or modules not expressly listed or inherent to such a process, method, product, or device. Names or numbers of steps in this disclosure do not mean that the steps in the method procedure need to be performed in a time/logical sequence indicated by the names or numbers. An execution sequence of the steps in the procedure that have been named or numbered can be changed based on a technical objective to be achieved, provided that same or similar technical effects can be achieved. Division into units in this disclosure is logical division. During actual application, there may be another division manner. For example, a plurality of units may be combined or integrated into another system, or some features may be ignored or not performed. In addition, the displayed or discussed mutual couplings or direct couplings or communication connections may be implemented through some interfaces. The indirect couplings or communication connections between the units may be implemented in electrical or other similar forms. This is not limited in this disclosure. In addition, units or subunits described as separate parts may or may not be physically separate, may or may not be physical units, or may be distributed into a plurality of circuit units. All or a part of the units may be selected based on actual requirements to achieve the objectives of the solutions of this disclosure.

The above are merely example embodiments of the present disclosure. It should be noted that a person skilled in the art may make several improvements and refinements without departing from the principles of the present disclosure, and these improvements and refinements should also be considered as the protection scope of the present disclosure.

What is claimed is:

1. A status notification method, implemented by a first network device, wherein the status notification method comprises:
   determining, by a first processor of the first network device, a lock status of a first logical lane in a first optical system of the first network device, wherein the lock status comprises a locked state or an unlocked state; and
   sending, by the first processor, first uplink notification information to a second optical system of a second network device when the lock status indicates that the first logical lane is locked,
   wherein the first uplink notification information enables the second optical system to determine that the first logical lane is locked,
   wherein the first optical system is coupled to the second optical system, and
   wherein the first uplink notification information is an alignment marker.

2. The status notification method of claim 1, further comprising:
   obtaining, by the first processor, downlink notification information; and
   determining, by the first processor based on the downlink notification information, that a second logical lane in the second optical system is locked.

3. The status notification method of claim 2, wherein after determining the first logical lane and the second logical lane are locked, the status notification method further comprises:
   encrypting, by the first optical system, first data sent to the second optical system; or
   decrypting, by the first optical system, second data received from the second optical system.

4. The status notification method of claim 1, wherein determining the lock status comprises:
   determining, by the first optical system, the lock status; or
   obtaining, by the first processor from the first optical system, the lock status.

5. The status notification method of claim 1, wherein determining the lock status comprises:
   determining a first status of each M transmitting logical lanes, wherein the first optical system comprises the first logical lanes comprising the M transmitting logical lanes and M receiving logical lanes, and wherein M is greater than or equal to 1; or
   determining a second status of each of the M receiving logical lanes.

6. The status notification method of claim 5, wherein determining that the first logical lane is locked comprises:
   determining that the M transmitting logical lanes are locked; or
   determining that the M receiving logical lanes are locked.

7. The status notification method of claim 6, wherein sending the first uplink notification information comprises:
   sending, by the first optical system, M pieces of second uplink notification information to the second optical system respectively over the M transmitting logical lanes, wherein each of the M pieces of second uplink notification information indicates that either a corresponding transmitting logical lane for sending the second uplink notification information is locked or a corresponding receiving logical lane corresponding to the corresponding transmitting logical lane is locked; or
   sending, by the first processor, third uplink notification information to a second processor of the second network device, wherein the third uplink notification information indicates that the M transmitting logical lanes or the M receiving logical lanes are locked.

8. The status notification method of claim 5, wherein determining that the first logical lane is locked comprises one or more of:
   determining that one or more of the M transmitting logical lanes are locked;
   determining that one or more of the M receiving logical lanes are locked; or
   determining that the one or more of the M transmitting logical lanes and one or more corresponding receiving logical lanes are locked.

9. The status notification method of claim 8, wherein sending the first uplink notification information comprises:
   sending, by the first optical system, second uplink notification information to the second optical system over j transmitting logical lanes, wherein the second uplink notification information indicates that the j transmitting logical lanes are locked, corresponding receiving logical lanes corresponding to the j transmitting logical lanes are locked, or the j transmitting logical lanes and the corresponding receiving logical lanes are locked, wherein j is greater than 1 and less than M, and wherein each of a plurality of first transmitting logical lanes corresponds to one piece of the second uplink notification information when the j transmitting logical lanes comprise the first transmitting logical lanes; or
   sending, by the first processor, third uplink notification information to a second processor of the second network device, wherein the third uplink notification information indicates that the j transmitting logical lanes are locked, the corresponding receiving logical lanes are locked, or the j transmitting logical lanes and the corresponding receiving logical lanes are locked.

10. The status notification method of claim 7, wherein each of the M pieces of second uplink notification information comprises an identifier of the corresponding transmitting logical lane and a lock flag.

11. The status notification method of claim 10, wherein the second uplink notification information is an alignment marker, and wherein the status notification method further comprises obtaining the lock flag by modifying a field in the alignment marker.

12. The status notification method of claim 11, wherein the field is a $UP_x$ field in a 200 gigabits (Gb)/400 Gb alignment marker.

13. The status notification method of claim 12, wherein the lock flag repeatedly appears in the $UP_x$ field.

14. The status notification method of claim 5, further comprising:
receiving, by the first optical system, M pieces of first downlink notification information over the M receiving logical lanes, wherein the M pieces of first downlink notification information indicate that a second logical lane in the second optical system is locked; or
receiving, by the first processor, second downlink notification information from a second processor of the second network device and sending, by the first processor, the second downlink notification information to the first optical system, wherein the second downlink notification information indicates that the second logical lane is locked.

15. The status notification method of claim 5, further comprising:
receiving, by the first optical system, first downlink notification information over p receiving logical lanes in the M receiving logical lanes, wherein the first downlink notification information indicates that first transmitting logical lanes and first receiving logical lanes that are of the second optical system and that correspond to the p receiving logical lanes are locked, wherein p is greater than 1 and less than M, and wherein each of a plurality of second receiving logical lanes corresponds to one piece of first downlink notification information when the p receiving logical lanes comprise the second receiving logical lanes; or
receiving, by the first processor, second downlink notification information from a second processor of the second network device and sending, by the first processor, the second downlink notification information to the first optical system, wherein the second downlink notification information indicates that the first transmitting logical lanes and the first receiving logical lanes are locked.

16. A first optical system comprising:
a memory configured to store instructions; and
a processor coupled to the memory and configured to execute the instructions to cause the first optical system to:
determine a lock status of a first logical lane in the first optical system, wherein the first optical system is of a first network device, wherein the lock status comprises a locked state or an unlocked state; and
send first uplink notification information when the lock status indicates that the first logical lane is locked, wherein the first uplink notification information enables a second optical system of a second network device to determine that the first logical lane is locked,
wherein the first optical system is coupled to the second optical system, and
wherein the first uplink notification information is an alignment marker.

17. The first optical system of claim 16, wherein the processor is further configured to execute the instructions to cause the first optical system to:
obtain downlink notification information; and
determine, based on the downlink notification information, that a second logical lane in the second optical system is locked.

18. The first optical system of claim 17, wherein after determining that the first logical lane and the second logical lane are locked, the processor is further configured to execute the instructions to cause the first optical system to:
encrypt first data sent to the second optical system; or
decrypt second data received from the second optical system.

19. The first optical system of claim 16, wherein the processor is further configured to execute the instructions to cause the first optical system to:
determine a first status of each of M transmitting logical lanes, wherein the first optical system comprises the first logical lanes comprising the M transmitting logical lanes and M receiving logical lanes, and wherein M is greater than or equal to 1; or
determine a second status of each of the M receiving logical lanes.

20. The first optical system of claim 19, wherein the processor is further configured to execute the instructions to cause the first optical system to:
determine that the M transmitting logical lanes are locked; or
determine that the M receiving logical lanes are locked.

21. The first optical system of claim 20, wherein the processor is further configured to execute the instructions to cause the first optical system to:
send M pieces of second uplink notification information to the second optical system respectively over the M transmitting logical lanes, wherein each of the M pieces of first uplink notification information indicates that either a corresponding transmitting logical lane for sending the second uplink notification information is locked or a corresponding receiving logical lane corresponding to the corresponding transmitting logical lane is locked; or
send third uplink notification information to a second processor of the first network device to enable the second processor to send the third uplink notification information to a third processor of the second network device, wherein the third uplink notification information indicates that the M transmitting logical lanes or the M receiving logical lanes are locked.

22. The first optical system of claim 19, wherein the processor is further configured to execute the instructions to cause the first optical system to perform one or more of:
determining one or more of the M transmitting logical lanes are locked;
determining one or more of the M receiving logical lanes are locked; and
determining the one or more of the M transmitting logical lanes and one or more corresponding receiving logical lanes are locked.

23. The first optical system of claim 22, wherein the processor is further configured to execute the instructions to cause the first optical system to:
send second uplink notification information to the second optical system over j transmitting logical lanes, wherein the second uplink notification information indicates that the j transmitting logical lanes are locked, corresponding receiving logical lanes corresponding to the j transmitting logical lanes are locked, or the j transmitting logical lanes and the corresponding receiving logical lanes are locked, wherein j is greater than 1 and less than M, and wherein each of a plurality of first transmitting logical lanes corresponds to one piece of the second uplink notification information when the j transmitting logical lanes comprise the first transmitting logical lanes; or send third uplink notification information to a second processor of the first network device to enable the second processor to send the third uplink notification information to a third processor of the second network device, wherein the third uplink notification information indicates that the j transmitting logical lanes are locked, the corresponding receiving logical lanes are locked, or the j transmitting logical lanes and the corresponding receiving logical lanes are locked.

24. The first optical system of claim 21, wherein each of the M pieces of second uplink notification information comprises an identifier of the corresponding transmitting logical lane and a lock flag.

25. The first optical system of claim 24, wherein the second uplink notification information is an alignment marker, and wherein the processor is further configured to execute the instructions to cause the first optical system to obtain the lock flag by modifying a value of a field in the alignment marker.

26. A first network device comprising:
a first optical system configured to determine a lock status of a first logical lane in the first optical system, wherein the lock status comprises a locked state or an unlocked state; and
a processor configured to:
obtain, from the first optical system, the lock status; and
send uplink notification information to a second network device when the lock status indicates that the first logical lane is locked,
wherein the uplink notification information indicates that the first logical lane is locked, and
wherein the uplink notification information is an alignment marker.

27. The first network device of claim 26, wherein the uplink notification information indicates that:
M transmitting logical lanes of the first optical system or M receiving logical lanes of the first optical system are locked; or
j transmitting logical lanes of the first optical system are locked, corresponding receiving logical lanes corresponding to the j transmitting logical lanes are locked, or the j transmitting logical lanes and the corresponding receiving logical lanes are locked,
wherein j is greater than 1 and less than M.

28. The first network device of claim 26, wherein the processor is further configured to:
receive downlink notification information from the second network device; and
send the downlink notification information to the first optical system,
wherein the downlink notification information indicates that:
a second logical lane in a second optical system of the second network device is locked; or
transmitting logical lanes and receiving logical lanes that are of the second optical system and that correspond to p receiving logical lanes are locked, wherein p is greater than 1 and less than M, and wherein the second optical system is coupled to the first optical system.

29. A network system comprising:
a first network device comprising:
a first optical system configured to:
obtain a lock status of a first logical lane in the first optical system; and
send uplink notification information; and
a second network device coupled to the first network device and comprising:
a second optical system communicatively coupled to the first optical system and configured to:
receive the uplink notification information; and
determine, based on the uplink notification information, that the first logical lane is locked, wherein the uplink notification information is an alignment marker.

30. The network system of claim 29, wherein the first network device is further configured to:
receive downlink notification information from the second network device; and
send the downlink notification information to the first optical system,
wherein the first optical system is further configured to determine, based on the downlink notification information, that a second logical lane in the second optical system is locked.

* * * * *